United States Patent [19]
Moritomo et al.

[11] Patent Number: 5,680,396
[45] Date of Patent: Oct. 21, 1997

[54] COMMUNICATION METHOD, TRANSMISSION APPARATUS, RECEPTION APPARATUS, AND TRANSMISSION LINE BANDWIDTH CONTROL APPARATUS FOR PVC CONNECTION TYPE SWITCHED NETWORK

[75] Inventors: Haruo Moritomo, Kawasaki; Hironori Ochiai, Fukuoka; Takashi Kato, Fukuoka; Tadashi Uchikoshi, Fukuoka; Yasuhiro Kajiwara, Fukuoka, all of Japan

[73] Assignee: Fujitsu Limited, Kanagawa, Japan

[21] Appl. No.: 664,790

[22] Filed: Jun. 17, 1996

Related U.S. Application Data

[63] Continuation of Ser. No. 298,425, Aug. 30, 1994, abandoned.

[30] Foreign Application Priority Data

Mar. 7, 1994 [JP] Japan ................................. 6-035945

[51] Int. Cl.$^6$ ........................................... H04L 12/56
[52] U.S. Cl. ........................ 370/392; 370/399; 370/450; 370/468
[58] Field of Search ................................. 340/825.03, 826, 340/827, 825.06, 825.08, 825.54; 370/355, 360, 389, 392, 395, 398, 399, 449, 450, 468, 477

[56] References Cited

U.S. PATENT DOCUMENTS

| | | | |
|---|---|---|---|
| 4,870,641 | 9/1989 | Pattavina | 370/94.1 |
| 5,253,252 | 10/1993 | Tobol | 370/85.5 |
| 5,255,266 | 10/1993 | Watanabe et al. | 370/60.1 |
| 5,258,979 | 11/1993 | Oomuro et al. | 370/80 |
| 5,265,091 | 11/1993 | van Landegem | 370/94.1 |
| 5,287,535 | 2/1994 | Sakagawa et al. | 370/60.1 |
| 5,333,131 | 7/1994 | Tanabe et al. | 370/60 |
| 5,392,402 | 2/1995 | Robrock, II | 370/60.1 |
| 5,446,733 | 8/1995 | Tsuruoka | 370/60.1 |

FOREIGN PATENT DOCUMENTS 583287  4/1993  Japan.

*Primary Examiner*—Alpus H. Hsu
*Attorney, Agent, or Firm*—Helfgott & Karas, P.C.

[57] ABSTRACT

The invention provides a communication method for realizing communications between different apparatus in a PVC connection type switched network, which is improved in that PVCs in the inside of the switched network can be set efficiently using preset PVCs dynamically to allow high speed communications without complicating the communication protocol. The communication method is applied to a PVC connection type switched network wherein a plurality of transmission apparatus and at least one reception apparatus are connected to each other by PVC connections by way of an exchange switch which handles fixed length cells. According to the communication method, one or more of the transmission apparatus which have acquired an access right to a PVC to be used performs transmission to the reception apparatus using respective transmission line bandwidths.

30 Claims, 39 Drawing Sheets

COMMUNICATION METHOD, TRANSMISSION APPARATUS, RECEPTION APPARATUS, AND TRANSMISSION LINE BANDWIDTH CONTROL APPARATUS FOR PVC CONNECTION TYPE SWITCHED NETWORK

This is a continuation of application Ser. No. 08/298,425, filed Aug. 30, 1994, now abandoned.

BACKGROUND OF THE INVENTION

1) Field of the Invention

This invention relates to a communication method for realizing communications between different apparatus in a network wherein a plurality of transmission apparatus and at least one reception apparatus are connected to each other by PVC (Permanent Virtual Connection: connectionless) connections by an exchange switch which handles fixed length cells or packets such as an ATM (Asynchronous Transfer Mode) exchange switch and also to a transmission apparatus, a reception apparatus, a PVC control apparatus and a transmission line bandwidth control apparatus for use with such network.

2) Description of the Related Art

It is required for an ATM switched network which makes the core of realization of a wide band ISDN to realize a PVC service wherein communication lines are fixedly contracted with users in advance without the necessity of a special procedure upon origination of a call. Since bandwidths of the PVCs required then are assured fixedly within the ATM network, the number of PVCs which can be assured in the ATM network is limited in accordance with the internal capacity of the network. Therefore, an ATM network requires a communication method wherein PVCs (Permananet Virtual Channels) are utilized effectively within limited bandwidths of the network to ensure the service quality of communications.

An exemplary communication system for a PVC connection type exchange network of the type described above is shown in FIG. 40. Referring to FIG. 40, the communication system includes an ATM exchange switch 101, and a plurality of transmission apparatus (users) 102-1 and 102-2 and at least one reception apparatus 103 connected to the ATM exchange switch or network 101. The transmission apparatus 102-1 and 102-2 and the reception apparatus 103 are connected to each other by PVC (Permanent Virtual Channel) connections to the ATM exchange switch 101.

A PVC is set for each of the users 102-1 and 102-2, and bandwidths are allocated to the PVCs so that they do not exceed a bandwidth c of the ATM transmission line as seen from FIG. 40. In particular, where the bandwidth of the PVC1 for the transmission apparatus 102-1 is a and the bandwidth of the PVC2 for the transmission apparatus 102-2 is b, the bandwidths a and b are allocated so that a+b≦c. Consequently, as the number of PVCs involved increases, the bandwidth per one PVC decreases. Accordingly, the number of PVCs which can be set depends upon the capacity of the ATM transmission line.

Also an SVC (Switched Virtual Connection) system wherein a user sends out a call origination signal to an ATM network to assure a bandwidth necessary for communications has been investigated and proposed.

By the way, an Ethernet has such a construction as shown in FIG. 41. Referring to FIG. 41, the Ethernet employs a single bus 201 of 10 Mbps which interconnects terminals 202A, 202B, 202C and 202D by way of respective 10BASE-T/⅔ connectors.

However, the construction of the Ethernet involves a problem of wiring. Therefore, another Ethernet construction which is used in such an HUB construction as shown in FIG. 42 wherein terminals 302A, 302B, 302C and 302D are connected by way of an HUB 301 whose handling rate is approximately 10 Mbps has been and is increasing. In this instance, however, each of the terminals 302A, 302B, 302C and 302D can actually operate only at the rate of several Mbps.

Also such a further Ethernet construction as shown in FIG. 43 may seem possible. Referring to FIG. 43, the Ethernet construction shown is used in a high speed HUB construction wherein terminals 402A, 402B, 402C and 402D are connected by way of a high speed HUB 401. In this instance, however, each of the terminals 402A, 402B, 402C and 402D can operate only at several to approximately 10 Mbps.

It is forecast that, as high speed communications are developed in future and such ATM technique as described above is required for data communications or multi-media communications, a single terminal uses several tens Mbps to approximately 100 Mbps and is realized with a high speed back plane.

For example, several products of a switched network of such a configuration as shown in FIG. 44 wherein a cell switch 501 is provided as a back plane and terminals 502A and 502B of a LAN (Local Area Network) are accommodated in the cell switch 501 have been made public in several countries. In the configuration shown in FIG. 44, LAN data terminate at a LAN termination portion 503A or 503B and are converted into cells by a CLAD section 504A or 504B, which has a frame to cell conversion function. The cells are then inputted to and exchanged by the cell switch 501 and transmitted to another port. It is to be noted that the actual traffic bandwidth between the CLAD sections 504A and 504B and the cell switch 501 is approximately several Mbps and the physical rate is 156 Mbps.

Also such a system as shown in FIG. 45 has been developed as a product. Referring to FIG. 45, a cell switch 601 has, as an internal construction, a buffer 602 which can handle the bandwidth of 156 Mbps. In the system shown, while it has a transmission rate of 10 Mbps, the actual traffic at each of terminals 603A, 603B and 603C is less than 10 Mbps, and also the number of accommodated interfaces is 4 to 8. Consequently, the bandwidth of the buffer 602 need not be controlled. It is to be noted that reference numeral 604 in FIG. 45 denotes a reception terminal.

However, since communications of a LAN are connectionless communications, they do not have a call set-up procedure and involve no report of a bandwidth. Normally, in connectionless communications, a path is extended to a user with a bandwidth settled with the user in advance. Meanwhile, another path is sometimes extended with a maximum bandwidth to a PVC connection.

It is expected that a switched network has such a development which satisfies demands for high speed communications and enlargement of the scale as shown in FIG. 46 wherein the actual traffic of terminals 703A, 703B and 703C which has a bandwidth of 100 Mbps is handled by means of a buffer 702 incorporated in a cell switch 701 is forecast. In this instance, 100 Mbps data of a high speed LAN interface such as an FDDI (SAS) or a TPDDI are inputted as an actual traffic. It is to be noted that reference numeral 704 in FIG. 46 denotes a reception terminal.

When high speed interfaces as described above operate in a full driven condition, since each of them requires a bandwidth of 100 Mbps, a path cannot be provided in advance.

Therefore, use as a so-called SVC wherein a path is provided when information is to flow is required.

With such SVC system, however, while it is necessary to ensure a bandwidth necessary for communications, a complicated procedure (call request, call request acceptance, etc.) is required between a user and the network. Consequently, the SVC system has a communication form which is complicated.

Further, if a path is set simply with a maximum bandwidth, then simultaneous communications are impossible. Accordingly, bandwidth control in accordance with actual traffic is required.

If no bandwidth controlling function is provided, a buffer may overflow or underflow, which causes abandonment of cells and hence causes a drop or miss of information. Therefore, complete communications may not possibly be achieved.

SUMMARY OF THE INVENTION

It is an object of the present invention to provide a communication method for a virtual channel connection type switched network, a transmission apparatus and a reception apparatus for a PVC connection type switched network, a virtual channel control apparatus for a virtual channel connection type switched network and a transmission line bandwidth control apparatus for a PVC connection type switched network wherein virtual channels inside of the switched network can be set efficiently using preset virtual channels dynamically to allow high speed communications without complicating the communication protocol.

In order to attain the object described above, according to an aspect of the present invention, there is provided a communication method for a PVC connection type switched network wherein a plurality of transmission apparatus and at least one reception apparatus are connected to each other by virtual channels (PVC) by an exchange switch which handles fixed length cells, wherein one or more of the transmission apparatus which have acquired an access right to a PVC to be used performs transmission to the reception apparatus using respective transmission line bandwidths.

Preferably, a message representative of the access right is normally circulated among the plurality of transmission apparatus, and any of the transmission apparatus acquires the access right to a PVC to be used by receiving the message.

Alternatively, the access right may be successively given to the plurality of transmission apparatus by virtual channel control means, which is connected to the reception apparatus for controlling a right of use of the virtual channel, so that the transmission apparatus acquires the access right to the virtual channel.

Otherwise, any of the plurality of transmission apparatus may acquire the access right to a PVC to be used by inquiring, upon starting communications with the reception apparatus, virtual channel (PVC) control means which is connected to the reception apparatus for controlling a right of use of the PVC. In this instance, when the PVC connected to the reception apparatus is busy as a result of the inquiry to the virtual channel (PVC) control means, the PVC control means may perform access right giving processing in accordance with a preferential order condition. Further in this instance, when the PVC connected to the reception apparatus is busy as a result of the inquiry to the virtual channel (PVC) control means, the PVC control means may queue the transmission apparatus which has made the inquiry, and after the virtual channel (PVC) is released, the PVC control means may give the access right to the transmission apparatus. Or else, when the PVC connected to the reception apparatus is busy as a result of the inquiry to the PVC control means, the PVC control means may return to the transmission apparatus which has made the inquiry a message of rejection to give the access right to the transmission apparatus.

In any form of the communication method, the PVC control means may provided in the reception apparatus or alternatively in a control apparatus of the exchange switch.

According to another aspect of the present invention, there is provided a transmission apparatus for a PVC connection type exchange network wherein the transmission apparatus is connected by a PVC connection to a reception apparatus together with one or more other transmission apparatus by way of an exchange switch which handles fixed length cells, which comprises access right acquisition determination means for determining whether or not an access right to a PVC to be used is acquired, and cell sending out means for transmitting cells to the reception apparatus using a transmission line bandwidth when it is determined by the access right acquisition determination means that the access right to the PVC is acquired.

The access right acquisition determination means may determine that the access right is acquired when it receives a message representative of the access right which is circulated among the transmission apparatus involved in the PVC connection type exchange network.

Alternatively, the access right acquisition determination means may determine that the access right is acquired when the access right is given by PVC control means which is connected to the reception apparatus for controlling a right of use of the PVC.

According to a further aspect of the present invention, there is provided a reception apparatus for a PVC connection type exchange network wherein the reception apparatus is connected by a PVC connection to a plurality of transmission apparatus by way of an exchange switch which handles fixed length cells, which comprises cell reception means for receiving cells, and PVC control means for controlling a right of use of the PVC, the PVC control means successively giving an access right to the plurality of transmission apparatus.

The PVC control means may receive inquiry information for acquisition of the access right sent thereto when any of the plurality of transmission apparatus tries to start communications with the reception apparatus, and give the access right to the transmission apparatus in response to the inquiry information. In this instance, the PVC control means may perform access right giving processing in accordance with a preferential order condition when the PVC connected to the reception apparatus is busy. Further in this instance, the PVC control means may queue, when the PVC connected to the reception apparatus is busy, that one of the transmission apparatus from which the inquiry information has been received, and after the PVC is released, the PVC control means may give the access right to the queued transmission apparatus. Or else, the PVC control means may return, when the PVC connected to the reception apparatus is busy, a message of rejection to give the access right to that one of the transmission apparatus from which the inquiry information has been received.

According to a still further aspect of the present invention, there is provided a PVC control apparatus for a PVC connection type switched network wherein a plurality of transmission apparatus and at least one reception apparatus are connected to each other by PVC connections by way of an exchange switch which handles fixed length cells, which comprises PVC control means for controlling a right of use of a PVC, the PVC control means successively giving an access right to the plurality of transmission apparatus.

The the PVC control means may receive inquiry information for acquisition of the access right sent thereto when any of the plurality of transmission apparatus tries to start communications with the reception apparatus, and give the access right to the transmission apparatus in response to the inquiry information. In this instance, the PVC control means may perform access right giving processing in accordance with a preferential order condition when the PVC connected to the reception apparatus is busy. Further in this instance, the PVC control means may queue, when the PVC connected to the reception apparatus is busy, that one of the transmission apparatus from which the inquiry information has been received, and after the PVC is released, the PVC control means gives the access right to the queued transmission apparatus. Or otherwise, the PVC control means may return, when the PVC connected to the reception apparatus is busy, a message of rejection to give the access right to that one of the transmission apparatus from which the inquiry information has been received.

According to yet a further aspect of the present invention, there is provided a communication method for a PVC connection type switched network wherein a transmission apparatus and a reception apparatus are connected to each other by a PVC connection by way of an exchange switch which handles fixed length cells, which comprises the steps of setting a transmission line bandwidth for each frame as an information unit which is handled by the transmission apparatus, and performing transmission to the reception apparatus using the thus set transmission line bandwidth.

The step of setting a transmission line bandwidth may include the steps of determining, by bandwidth setting determination means, whether acceptance of setting of a transmission line bandwidth is to be permitted or rejected depending upon whether or not the sum of a bandwidth being used at present and a requested bandwidth exceeds a maximum usable bandwidth, queuing the band setting request from the transmission apparatus when it is determined by the bandwidth setting determination means that acceptance of setting of a transmission line bandwidth should be rejected, and permitting, after permission of acceptance of setting of a transmission line bandwidth becomes possible, the transmission apparatus which has made the bandwidth setting request to perform transmission to the reception apparatus with the transmission line bandwidth set for each frame.

According to yet a further aspect of the present invention, there is provided a transmission line bandwidth control apparatus for a PVC connection type switched network wherein a transmission apparatus and a reception apparatus are connected to each other by a PVC connection by way of an exchange switch which handles fixed length cells, which comprises bandwidth setting means for setting a transmission line bandwidth for each frame as an information unit which is handled by the transmission apparatus.

The transmission line bandwidth control apparatus for a PVC connection type switched network may further comprise bandwidth setting determination means for determining, upon setting of a transmission line bandwidth, whether acceptance of setting of a transmission line bandwidth is to be permitted or rejected depending upon whether or not the sum of a bandwidth being used at present and a requested bandwidth exceeds a maximum usable bandwidth, and supervisory means for queuing, when it is determined by the bandwidth setting determination means that acceptance of setting of a transmission line bandwidth should be rejected, the bandwidth setting request from the transmission apparatus and permitting, when permission of acceptance of setting of a transmission line bandwidth thereafter becomes possible, the transmission apparatus which has made the bandwidth setting request to perform transmission to the reception apparatus with the transmission line bandwidth set for each frame.

Accordingly, the following effects or advantages can be achieved by the present invention.

1. High speed communications which makes full use of the bandwidth of the transmission line can be realized with a simple construction without dividing the bandwidth of the transmission line by the connection number of PVCs, which contributes very much to realization of high speed connectionless communications in which an exchange switch is employed.

2. High speed access control can be achieved without depending upon a complicated signaling procedure.

3. Access control can be realized by a simple signaling procedure.

4. A countermeasure against a trouble can be realized readily by concentrated control of the PVCs, which are used switchably, by the PVC control means.

5. Once a transmission apparatus acquires the access right, it can continue to hold the access right with certainty unless another transmission apparatus uses the PVC, and data transmission can be performed continuously without particularly executing access control.

6. Data transmission can be performed continuously without additionally providing a PVC control device.

7. Simultaneous communications can be performed with certainty.

8. Even if communications cannot be accepted when a request for communications is developed, if a free bandwidth is thereafter produced, then acceptance of communications with a desired requested bandwidth is permitted, and consequently, simultaneous communications can be performed effectively.

Further objects, features and advantages of the present invention will become apparent from the following detailed description when read in conjunction with the accompanying drawings in which like parts or elements are denoted by like reference characters.

DESCRIPTION OF THE PREFERRED EMBODIMENTS a. Aspects of the Invention

Figure 1:
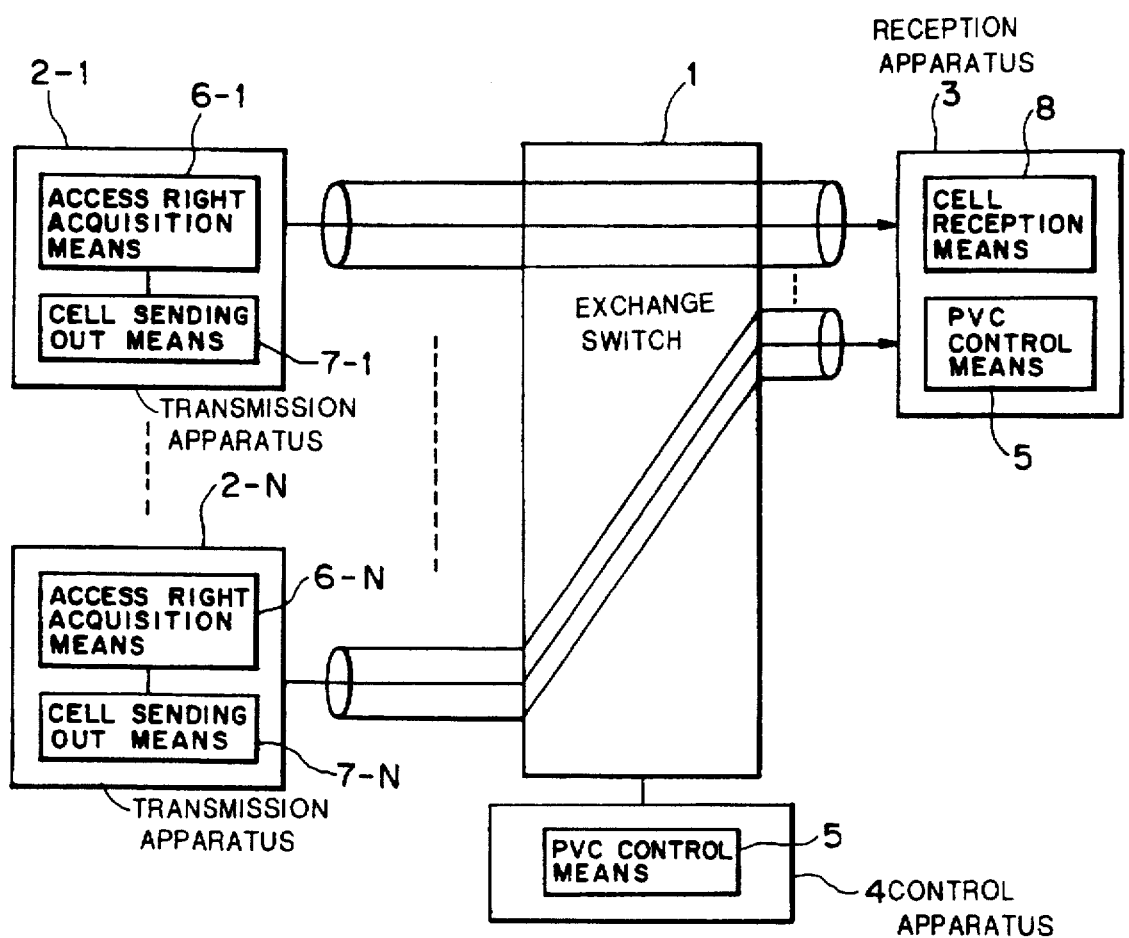
FIG. 1 is a block diagram illustrating an aspect of the present invention.

Referring first to FIG. 1, there is illustrated an aspect of the present invention. A plurality of transmission apparatus $2-1, \ldots, 2-N$ (N is a natural number) are connected to an exchange switch 1 which handles fixed length cells, and at least one reception apparatus 3 is connected to the exchange switch 1. The transmission apparatus $2-1, \ldots, 2-N$ and the reception apparatus 3 are connected to each other by PVC connections by the exchange switch 1. The exchange switch 1 is controlled by a control apparatus 4.

In the aspect of the present invention illustrated in FIG. 1, transmission to the reception apparatus 3 is basically performed with a desired transmission line bandwidth used by one of the transmission apparatus $2-i$ ($i=1, 2, \ldots, N$) which has acquired a right of access to a PVC to be used.

To this end, each transmission apparatus $2-i$ includes access right acquisition determination means $6-i$ for determining whether or not an access right to a PVC to be used is acquired, and cell sending out means $7-i$ for transmitting cells to the reception apparatus 3 using a desired transmission line bandwidth when it is determined by the access right acquisition determination means $6-i$ that the access right to the PVC is acquired.

More particularly, a message representative of the access right is normally circulated among the plurality of transmission apparatus $2-i$, and any of the transmission apparatus $2-i$ acquires the access right to a PVC to be used by receiving the message. To this end, the access right acquisition determination means $6-i$ of each transmission apparatus $2-i$ is constructed such that it determines that the access right is acquired when it receives the message representative of the access right which is circulated among the transmission apparatus $6-i$.

Or, the access right is successively given to the plurality of transmission apparatus $2-i$ by PVC (virtual channel) control means 5, which is connected to the reception apparatus 3 for controlling the right to use of the PVC, so that any of the transmission apparatus $2-i$ acquires the access right to the PVC. To this end, the access right acquisition determination means $6-i$ of each transmission apparatus $2-i$ is constructed such that it determines that the access right is acquired when the access right is given by the PVC control means 5.

Or else, any of the plurality of transmission apparatus $2-i$ acquires the access right to a PVC to be used by inquiring, upon starting communications with the reception apparatus 3, the PVC control means 5 for such communications.

In this instance, when the PVC connected to the reception apparatus 3 is busy as a result of the inquiry to the PVC control means 5, the PVC control means 5 performs access right giving processing in accordance with a preferential order condition.

Further in this instance, when the PVC connected to the reception apparatus 3 is busy as a result of the inquiry to the PVC control means 5, the PVC control means 5 queues the transmission apparatus 2-i which has made the inquiry, and after the PVC is released, the PVC control means 5 gives the access right to the transmission apparatus 2-i.

Or in this instance, when the PVC connected to the reception apparatus 3 is busy as a result of the inquiry to the PVC control means 5, the PVC control means 5 may return to the transmission apparatus 2-i which has made the inquiry a message of rejection to give the access right to the transmission apparatus 2-i.

It is to be noted that the PVC control means 5 may be provided in the reception apparatus 3 or in the control apparatus 4 for the exchange switch 1.

Where the PVC control means 5 is provided in the reception apparatus 3, the reception apparatus 3 comprises the PVC control means 5 for controlling the right of use of the PVC in addition to cell reception means 8 for receiving cells. In this instance, the PVC control means 5 is constructed so as to successively give the access right to the plurality of transmission apparatus 2-i.

In this instance, the PVC control means 5 is further constructed such that it receives inquiry information for acquisition of the access right sent thereto when any of the plurality of transmission apparatus 2-i tries to start communications with the reception apparatus 3 and gives the access right to the transmission apparatus 2-i in response to the inquiry information. Further, the PVC control means 5 is constructed such that it performs access right giving processing in accordance with a preferential order condition when the PVC connected to the reception apparatus 3 is busy.

Further, in this instance, the PVC control means 5 may be constructed such that it queues, when the PVC connected to the reception apparatus 3 is busy, that one of the transmission apparatus 2-i from which the inquiry information has been received, and after the PVC is released, the PVC control means 5 gives the access right to the queued transmission apparatus 2-i, or such that it returns, when the PVC connected to the reception apparatus 3 is busy, a message of rejection to give the access right to that one of the transmission apparatus 2-i from which the inquiry information has been received.

Alternatively, the PVC control means 5 constructed so as to successively give the access right to the plurality of transmission apparatus 2-i may be provided at some other location, for example, in the control apparatus 4.

While, also in this instance, the PVC control means 5 is constructed such that it receives inquiry information for acquisition of the access right sent thereto when any of the plurality of transmission apparatus 2-i tries to start communications with the reception apparatus 3 and gives the access right to the transmission apparatus 2-i in response to the inquiry information, the PVC control means 5 is further constructed such that it performs access right giving processing in accordance with a preferential order condition when the PVC connected to the reception apparatus 3 is busy.

Also in this instance, the PVC control means 5 may be constructed such that it queues, when the PVC connected to the reception apparatus 3 is busy, that one of the transmission apparatus 2-i from which the inquiry information has been received, and after the PVC is released, the PVC control means 5 gives the access right to the queued transmission apparatus 2-i or such that it returns, when the PVC connected to the reception apparatus 3 is busy, a message of rejection to give the access right to that one of the transmission apparatus 2-i from which the inquiry information has been received.

Subsequently, operation of the aspect of the present invention illustrated in FIG. 1 will be described.

In particular, in the aspect of the present invention illustrated in FIG. 1, transmission to the reception apparatus 3 is basically performed with a desired transmission line bandwidth used by one of the transmission apparatus 2-i (i=1, 2, ..., N) which has acquired a right of access to a PVC to be used.

In particular, in each transmission apparatus 2-i, the access right acquisition determination means 6-i determines whether or not an access right to a PVC to be used is acquired, and the cell sending out means 7-i transmits cells to the reception apparatus 3 using a desired transmission line bandwidth when it is determined by the access right acquisition determination means 6-i that the access right to the PVC is acquired.

More particularly, a message representative of the access right is normally circulated among the plurality of transmission apparatus 2-i, and any of the transmission apparatus 2-i acquires the access right to a PVC to be used by receiving the message. In this instance, the access right acquisition determination means 6-i of the transmission apparatus 2-i determines that the access right is acquired when it receives the message representative of the access right which is circulated among the transmission apparatus 2-i.

Or, the PVC control means 5, which is provided in the reception apparatus 3 or at some other location such as in the control apparatus 4, may successively give the access right to the plurality of transmission apparatus 2-i so that any of the transmission apparatus 2-i may acquire the access right to the PVC. In this instance, the access right acquisition determination means 6-i of the transmission apparatus 2-i determines that the access right is acquired when the access right is given by the PVC control means 5.

Or else, any of the plurality of transmission apparatus 2-i may acquire the access right to a PVC to be used by inquiring, upon starting communications with the reception apparatus 3, the PVC control means 5 for such communications.

In this instance, when the PVC connected to the reception apparatus 3 is busy as a result of the inquiry to the PVC control means 5, the PVC control means 5 performs access right giving processing in accordance with the preferential order condition.

Further in this instance, when the PVC connected to the reception apparatus 3 is busy as a result of the inquiry to the PVC control means 5, the PVC control means 5 queues the transmission apparatus 2-i which has made the inquiry, and after the PVC is released, the PVC control means 5 gives the access right to the transmission apparatus Or in this instance, when the PVC connected to the reception apparatus 3 is busy as a result of the inquiry to the PVC control means 5, the PVC control means 5 may return to the transmission apparatus 2-i which has made the inquiry a message of rejection to give the access right to the transmission apparatus 2-i.

Where the PVC control means 5 is provided in the reception apparatus 3, the reception apparatus 3 receives cells at the cell reception means 8 and successively gives the access right to the plurality of transmission apparatus 2-i by means of the PVC control means 5 for controlling the right of use of the PVC.

In this instance, the PVC control means 5 further receives inquiry information for acquisition of the access right sent thereto when any of the plurality of transmission apparatus 2-i tries to start communications with the reception apparatus 3 and gives the access right to the transmission apparatus 2-i in response to the inquiry information. Further, the PVC control means 5 performs access right giving processing in accordance with the preferential order condition when the PVC connected to the reception apparatus 3 is busy.

Further, in this instance, the PVC control means 5 may queue, when the PVC connected to the reception apparatus 3 is busy, that one of the transmission apparatus 2-i from which the inquiry information has been received, and after the PVC is released, the PVC control means 5 may give the access right to the queued transmission apparatus 2-i, or it may return, when the PVC connected to the reception apparatus 3 is busy, a message of rejection to give the access right to that one of the transmission apparatus 2-i from which the inquiry information has been received.

Also where the PVC control means 5 constructed so as to successively give the access right to the plurality of transmission apparatus 2-i is provided at some other location such as, for example, in the control apparatus 4, the PVC control means 5 receives inquiry information for acquisition of the access right sent thereto when any of the plurality of transmission apparatus 2-i tries to start communications with the reception apparatus 3. Further, when the PVC connected to the reception apparatus 3 is busy, the the PVC control means 5 performs access right giving processing in accordance with the preferential order condition.

Also in this instance, the PVC control means 5 may queue, when the PVC connected to the reception apparatus 3 is busy, that one of the transmission apparatus 2-i from which the inquiry information has been received, and after the PVC is released, the PVC control means 5 gives the access right to the queued transmission apparatus 2-i, or it may return, when the PVC connected to the reception apparatus 3 is busy, a message of rejection to give the access right to that one of the transmission apparatus 2-i from which the inquiry information has been received.

Accordingly, the following effects or advantages can be achieved by the present invention.

1. High speed communications which makes full use of the bandwidth of the transmission line can be realized with a simple construction without dividing the bandwidth of the transmission line by the connection number of PVCs, which contributes very much to realization of high speed connectionless communications in which an exchange switch is employed.

2. High speed access control can be achieved without depending upon a complicated signaling procedure.

3. Access control can be realized by a simple signaling procedure.

4. A countermeasure against a trouble can be realized readily by concentrated control of the PVCs, which are used switchably, by the PVC control means.

5. Once a transmission apparatus acquires the access right, it can continue to hold the access right with certainty unless another transmission apparatus uses the PVC, and data transmission can be performed continuously without particularly executing access control.

6. Data transmission can be performed continuously without additionally providing a PVC control device.

Figure 2:
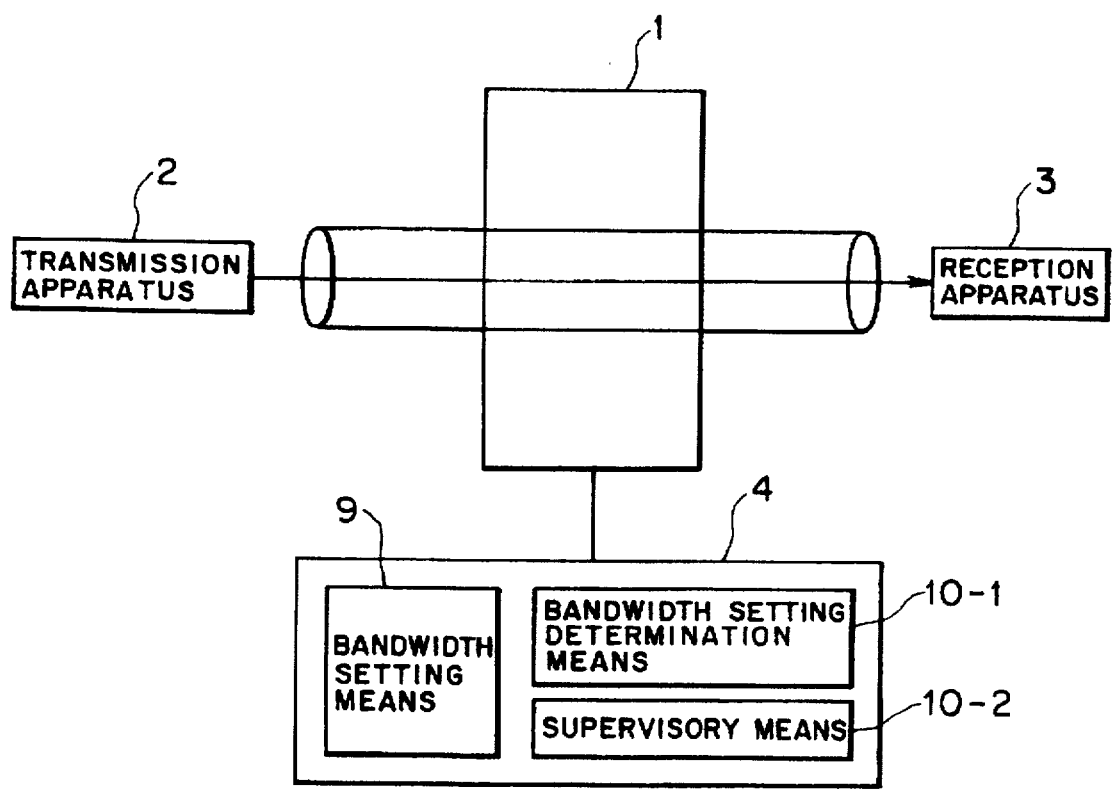
FIG. 2 is a block diagram illustrating another aspect of the present invention.

FIG. 2 illustrates another aspect of the present invention. Referring now to FIG. 2, a transmission apparatus 2 is connected to an exchange switch 1 which handles fixed length cells, and also a reception apparatus 3 is connected to the exchange switch 1. The exchange switch 1 is controlled by a control apparatus 4. Also here, the transmission apparatus 2 and the reception apparatus 3 are connected to each other by a PVC connection by way of the exchange switch 1.

In the aspect of the present invention illustrated in FIG. 2, transmission to the reception apparatus 3 is basically performed setting a transmission line bandwidth for each frame as an information unit handled by the transmission apparatus 2.

To this end, bandwidth setting means 9 for setting a transmission line bandwidth for each frame as an information unit which is handled by the transmission apparatus 2 is provided.

Further, in the aspect of the present invention, bandwidth setting determination means 10-1 for determining, upon setting of a transmission line bandwidth, whether acceptance of setting of a transmission line bandwidth is to be permitted or rejected depending upon whether or not the sum of a bandwidth being used at present and a requested bandwidth exceeds a maximum usable bandwidth, and supervisory means 10-2 for queuing, when it is determined by the bandwidth setting determination means 10-1 that acceptance of setting of a transmission line bandwidth should be rejected, the bandwidth setting request from the transmission apparatus 2 and permitting, when permission of acceptance of setting of a transmission line bandwidth thereafter becomes possible, the transmission apparatus 2 which has made the bandwidth setting request to perform transmission to the reception apparatus 3 with the transmission line bandwidth set for each frame, are provided.

Subsequently, the operation of the embodiment of the present invention illustrated in FIG. 2 will be described.

In particular, in the embodiment of the present invention illustrated in FIG. 2, transmission to the reception apparatus 3 is basically performed setting, by means of the bandwidth setting means 9, a transmission line bandwidth for each frame as an information unit handled by the transmission apparatus 2.

In this instance, the bandwidth setting determination means 10-1 determines, upon setting of a transmission line bandwidth, whether acceptance of setting of a transmission line bandwidth is to be permitted or rejected depending upon whether or not the sum of a bandwidth being used at present and a requested bandwidth exceeds a maximum usable bandwidth, and when it is determined by the bandwidth setting determination means 10-1 that acceptance of setting of a transmission line bandwidth should be rejected, the band setting request from the transmission apparatus 2 is queued. Then, after permission of acceptance of setting of a transmission line bandwidth becomes possible, the supervisory means 10-2 permits the transmission apparatus 2 which has made the bandwidth setting request to perform transmission to the reception apparatus 3 with the transmission line bandwidth set for each frame.

Accordingly, the following effects or advantages can be achieved by the present invention.

1. Simultaneous communications can be performed with certainty.

2. Even if communications cannot be accepted when a request for communications is developed, if a free bandwidth is thereafter produced, then acceptance of communications with a desired requested bandwidth is permitted, and consequently, simultaneous communications can be performed effectively.

b. First Embodiment

Figure 3:
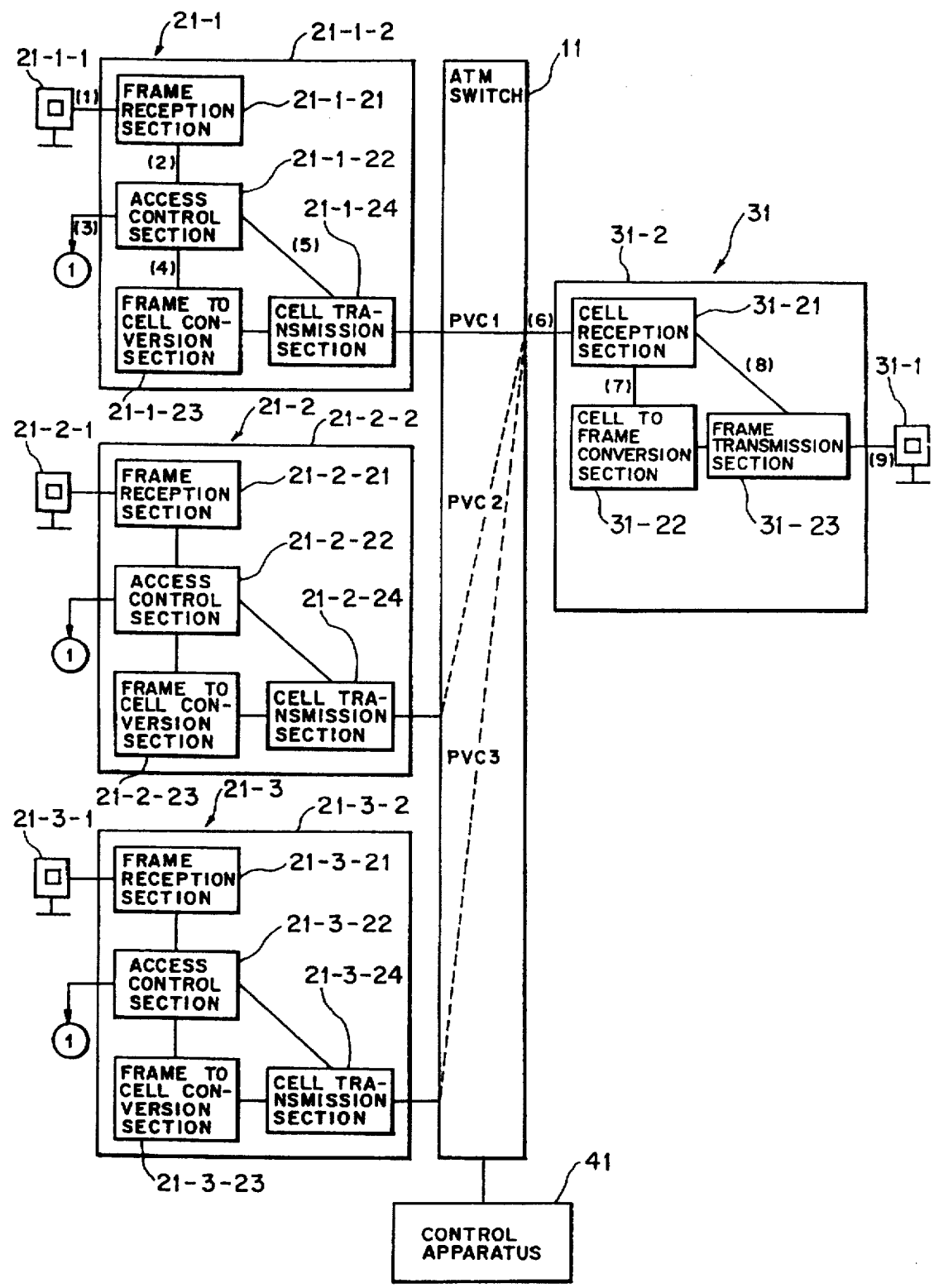
FIG. 3 is a block diagram of a LAN frame switched network showing a first preferred embodiment of the present invention.

Referring now to FIG. 3, there is shown a LAN frame switched network according to a first preferred embodiment of the present invention in which an ATM switch 11, that is, an exchange switch which handles fixed length cells, is employed.

The LAN frame switched network includes, in addition to the ATM switch 11, a plurality of transmission apparatus 21-1, 21-2 and 21-3 connected to the ATM switch 11, and a reception apparatus 31 connected to the ATM switch 11. The transmission apparatus 21-1, 21-2 and 21-3 and the reception apparatus 31 are connected to each other by PVC connections by way of the ATM switch 11. The ATM switch 11 is controlled by a control apparatus 41.

Each of the transmission apparatus 21-j (here, j =1, 2, 3) includes a LAN terminal 21-j-1 and a LAN interface module 21-j-2.

A terminal for multi-media is employed for the LAN terminal 2-j-1. The LAN terminal 21-j-1 is accommodated in the LAN interface module 21-j-2 so that a frame signal from the LAN terminal 21-i-1 is converted into cells by and transmitted from the LAN interface module 21-j-2.

To this end, the LAN interface module 21-j-2 is constituted from a frame reception section 21-j-21, an access control section 21-j-22, a frame to cell conversion section 21-j-23, and a cell transmission section 21-j-24.

The frame reception section 21-j-21 receives a LAN frame. The access control section 21-j-22 acquires a right of access to a PVC for transmission. The frame to cell conversion section 21-j-23 converts the LAN frame from the frame reception section 21-j-2 into ATM cells. The cell transmission section 21-j-24 transmits the ATM cells inputted thereto from the frame to cell conversion section 21-j-23.

Figure 5:
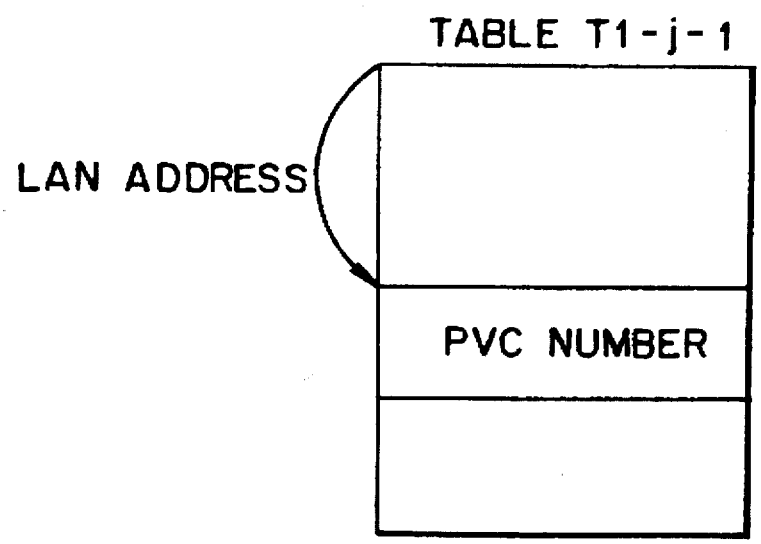
FIG. 5 is a diagrammatic view showing a PVC number table employed in the LAN frame switched network of FIG. 3.
Figure 6:
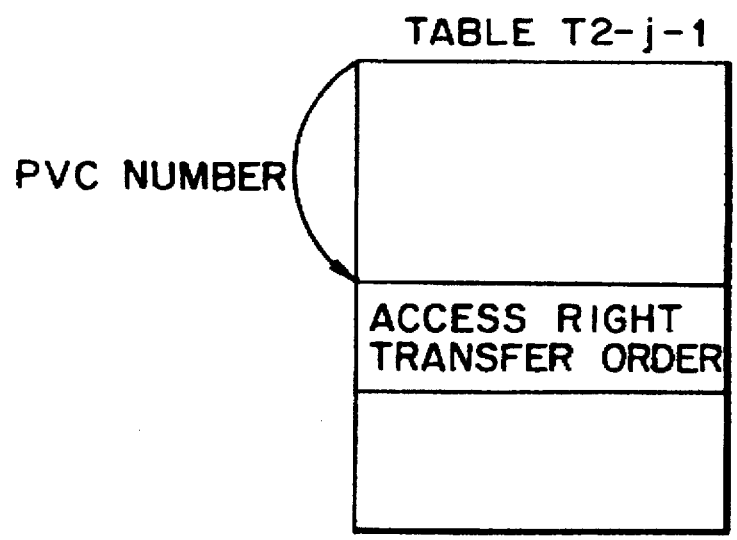
FIG. 6 is a similar view but showing an access right transfer order table employed in the LAN frame switched network of FIG. 3.

More particularly, the access control section 21-j-22 determines that an access right is acquired when it receives a message representative of an access right which is circulated among the transmission apparatus 21-j. The access control section 21-j-22 includes a transmission destination PVC number table T1-j-1 (refer to FIG. 5) for storing a transmission destination PVC number, and an access right transfer order table T2-j-1 (refer to FIG. 6) in which an access right transfer order is stored.

Accordingly, the access control section 21-J-22 has a function of access right acquisition determination means for determining whether or not an access right to a PVC to be used is acquired. The cell transmission section 21-i-24 has a function of cell sending out means for transmitting cells toward the reception apparatus 31 using a desired transmission line bandwidth when it is determined by the access control section 21-j-22 serving as access right acquisition determination means that an access right to a PVC is acquired.

Consequently, a transmission apparatus 21-j which has acquired the access right to the PVC to be accessed can perform transmission to the reception apparatus 31 using a desired transmission line bandwidth.

Meanwhile, the reception apparatus 31 is constituted from a LAN terminal 31-1 and a LAN interface module 31-2.

Also for the LAN terminal 31-1, a terminal for multimedia corresponding to the LAN terminal 21-j-1 is employed.

The LAN interface module 31-2 receives a cell signal from the ATM switch 11, converts the cell signal back into a frame signal and sends the frame signal to the LAN terminal 31-1 accommodated in the LAN interface module 31-2. To this end, the LAN interface module 31-2 is constituted from a cell reception section (cell reception means) 31-21, a cell to frame conversion section 31-22, and a frame transmission section 31-23.

The cell reception section 31-21 receives ATM cells. The cell to frame conversion section 31-22 converts the ATM cells into a LAN frame. The frame transmission section 31-23 transmits the LAN frame.

The LAN interface modules 21-3-2 are connected to the ATM switch 11 and accommodate the respective LAN terminals 21-i-1 as described above, and the LAN interface modules 21-j-2 on the transmission side and the LAN interface module 31-2 on the reception side are connected to each other by way of PVCs PVC1, PVC2 and PVC3, respectively.

Figure 7:
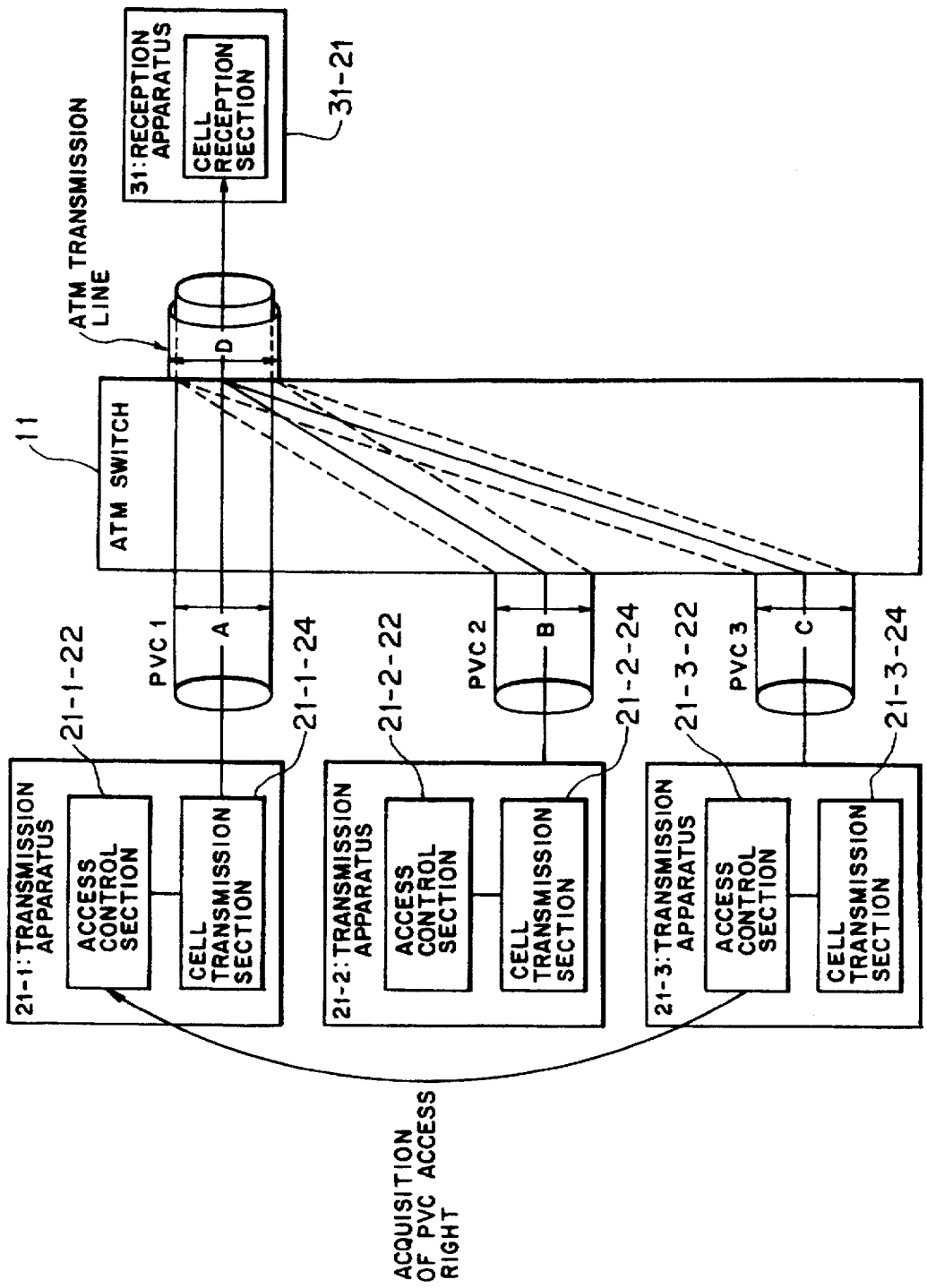
FIGS. 7 to 12 are block diagrams illustrating operation of the LAN frame switched network of FIG. 3.
Figure 8:
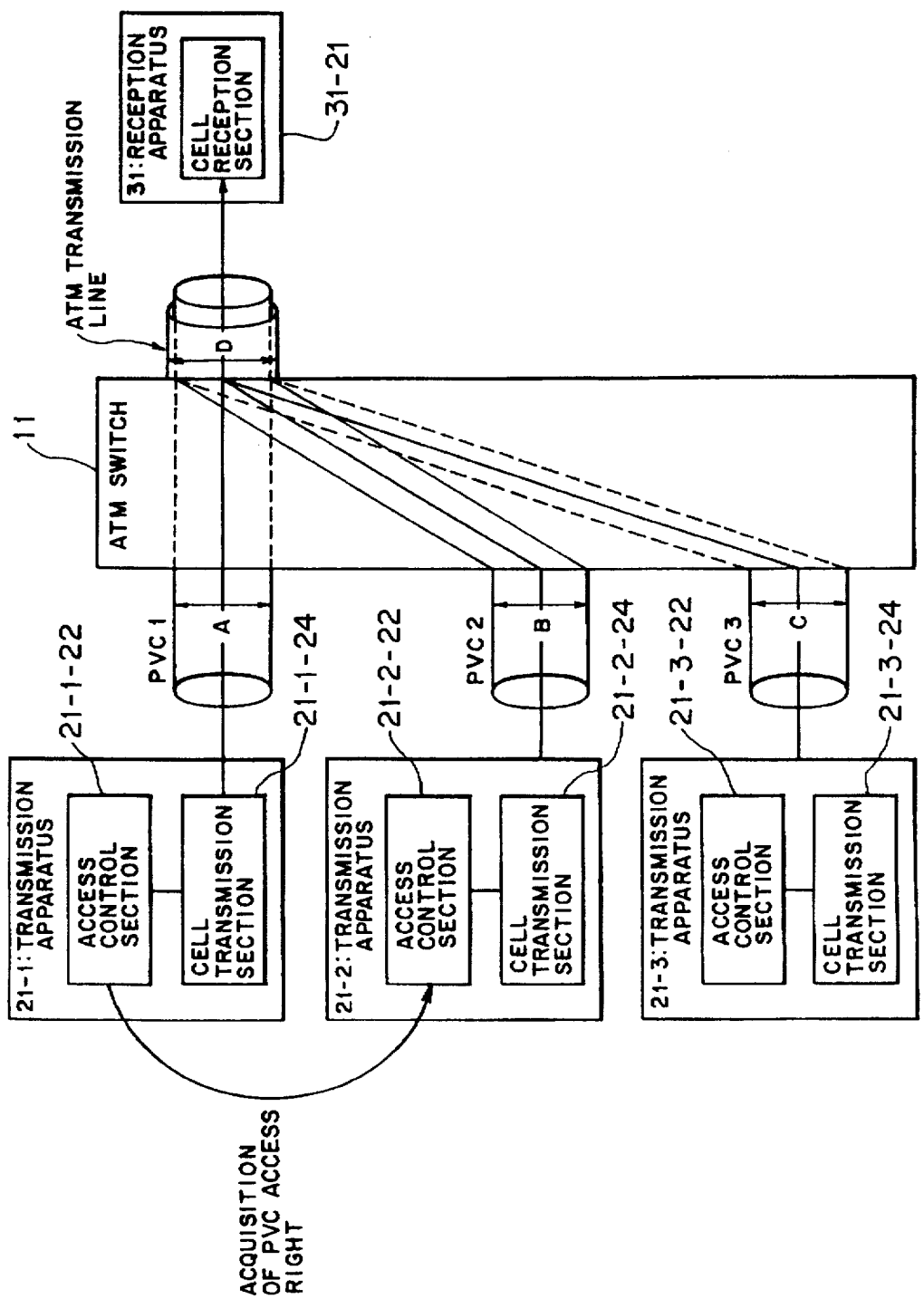
Figure 9:
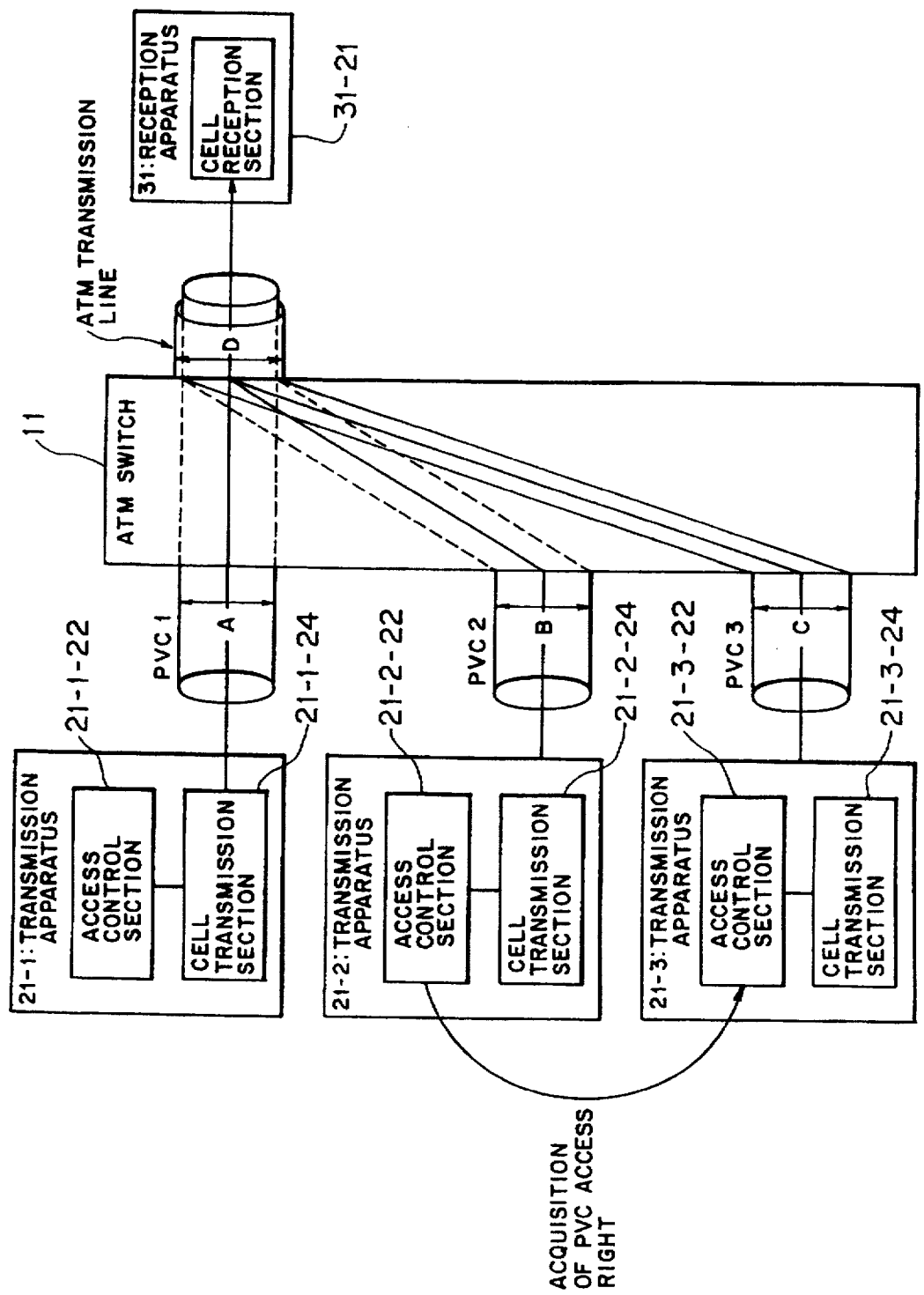

In the communication system in the first embodiment having the construction described above, when a transmission apparatus 21-j tries to transmit data, the access control section 21-j-22 of the transmission apparatus 21-j first acquires an access right to a PVC to be used as seen from FIGS. 7 to 9, and the cell transmission section 21-i-23 transmits ATM cells using the PVC thus acquired. Accordingly, the PVCs PVC1, PVC2 and PVC3 are not used at a time, and consequently, the bandwidth of the ATM transmission line which interconnects the reception apparatus 31 and the ATM switch 11 need not be divided among the PVCs PVC1, PVC2 and PVC3, but any of the PVCs PVC1, PVC2 and PVC3 can effect high speed communications using the full bandwidth of the ATM transmission line. In other words, any of the bandwidths A, B and C of the PVCs PVC1, PVC2 and PVC3 can use a bandwidth independently of one another within a range which does not exceed the bandwidth D of the ATM transmission line. Therefore, A $\leq$ D, B $\leq$ D and C $\leq$ D.

Figure 10:
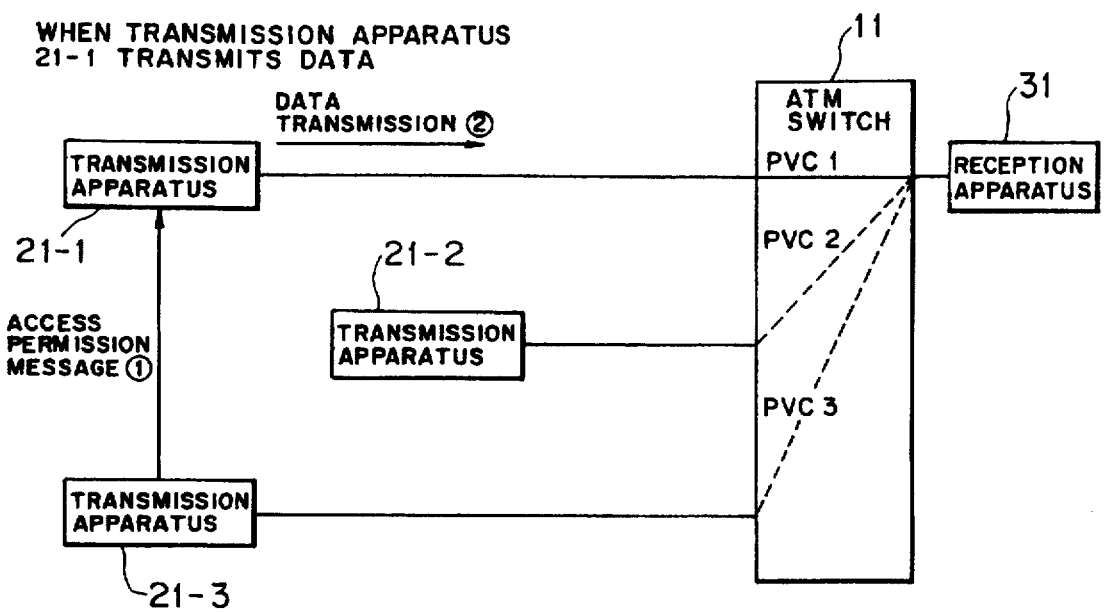
Figure 11:
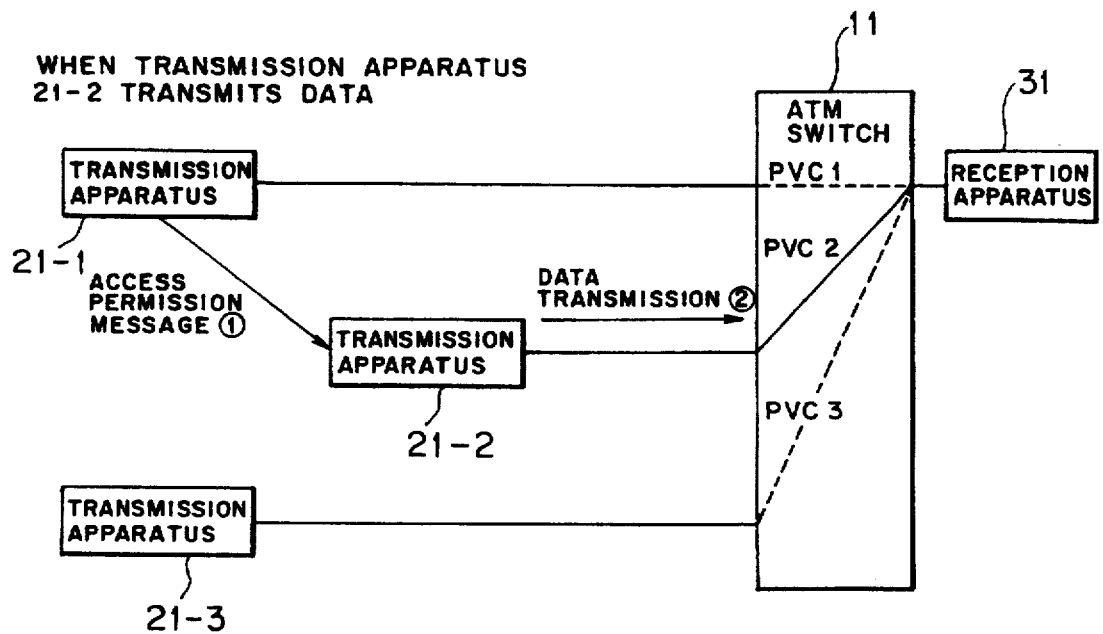
Figure 12:
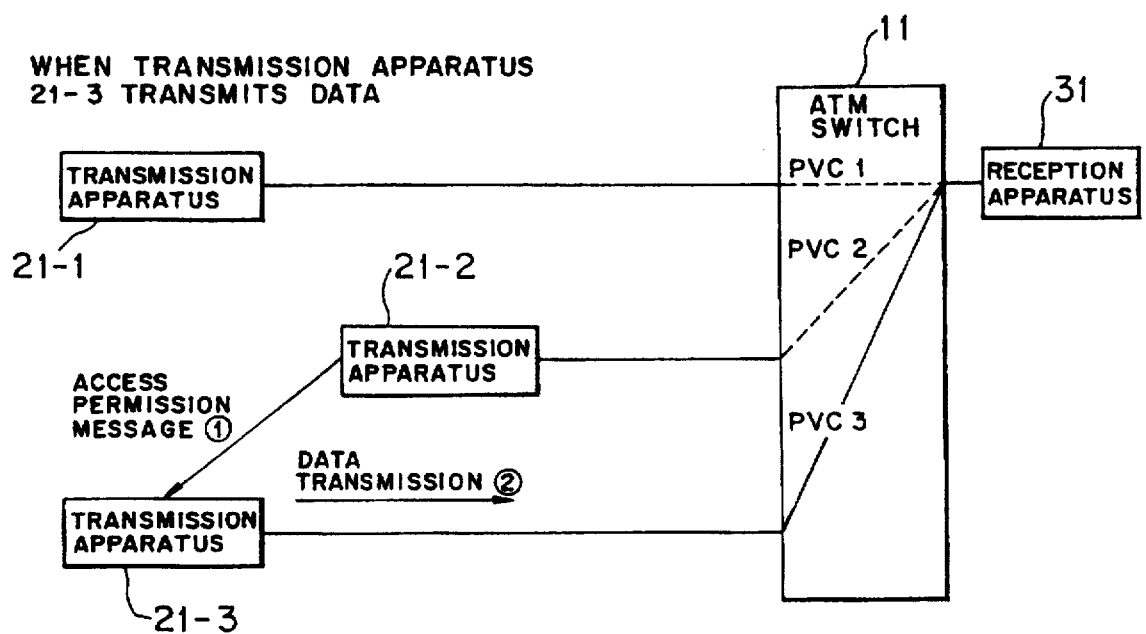

A technique of acquiring an access right to a PVC in the communication system described above is illustrated in FIGS. 10 to 12. Referring to FIGS. 10 to 12, a message (access permission message) representative of permission of use of a PVC is circulated normally among the transmission apparatus 21-1 to 21-3, for example, in the order of the transmission apparatus 21-1 → transmission apparatus 21-2 → transmission apparatus 21-3 → transmission apparatus 21-1 . . . , and when a transmission apparatus 21-j tries to transmit data, the access control section 21-j-22 in the transmission apparatus 21-j first waits until the access permission message is received from another transmission apparatus, and then data are transmitted. Then, after completion of transmission of the data, the access permission message is transmitted to a next transmission apparatus. Accordingly, high speed access control can be performed without depending upon a complicated signaling procedure.

Operation of the LAN frame switched network in the present embodiment will be described subsequently with reference to FIGS. 3 to 6. When data are to be transmitted, for example, from the LAN terminal 21-1-1 to the LAN terminal 31-1, data (a LAN frame) transmitted from the LAN terminal 21-1-1 are received by the frame reception section 21-1-21 of the LAN interface module 21-1-2 (refer to (1) in FIG. 3 and step A1 in FIG. 4).

Upon reception of the frame, the frame reception section 21-1-21 notifies reception of the frame to the access control section 21-1-22 (refer to (2) in FIG. 3).

The access control section 21-1-22 of the LAN interface module 21-1-2 extracts a transmission destination PVC from a LAN address in the received frame using the transmission destination PVC number table T1-1-1 (refer to FIG. 5) of the access control section 1-22 (refer to step A2 in FIG. 4) and discriminates that the frame is destined for the LAN terminal 31-1. Then, the access control section 21-1-22 communicates messages with the access control section 21-2-22 (or 21-3-22) of another LAN interface module 21-2-2 (or 21-3-2) to acquire the access right (refer to (3) in FIG. 3). In this instance, when the access control section 21-1-22 receives the message representative of the access right which is circulated among the transmission apparatus 21-j, it determines that it has acquired the access right (refer to step A3 in FIG. 4).

Figure 4:
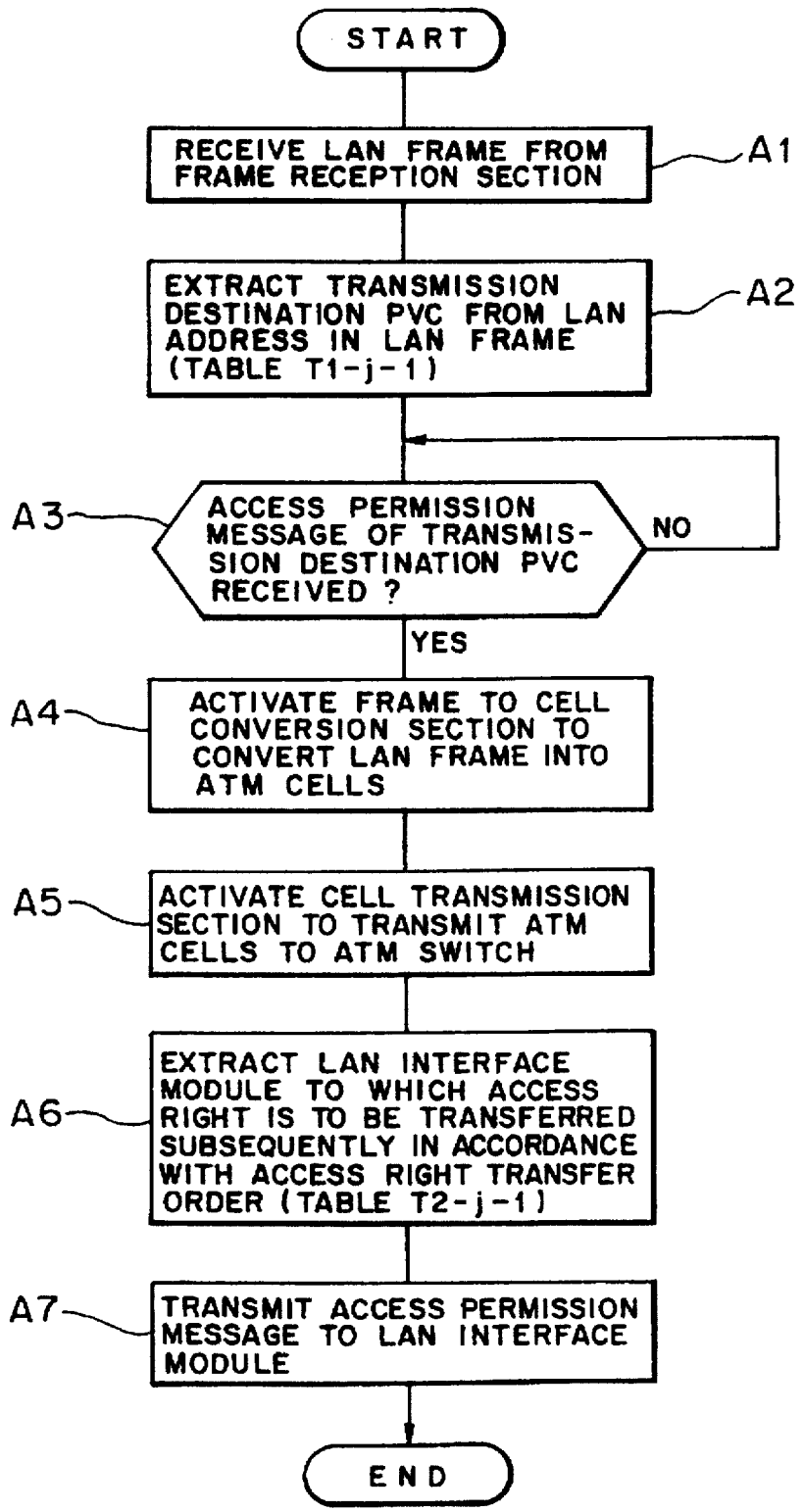
FIG. 4 is a flow chart illustrating operation of the LAN frame switched network of FIG. 3.

After the access right is acquired in this manner, the access control section 21-1-22 of the LAN interface module 21-1-2 activates the frame to cell conversion section 21-1-23 so that the LAN frame is converted into ATM cells by the frame to cell conversion section 21-1-23 (refer to (4) in FIG. 3 and step A4 in FIG. 4). Further, the access control section 21-1-22 activates the cell transmission section 21-1-24 (refer to (5) in FIG. 3) so that the ATM cells are transmitted from the cell transmission section 21-1-24 to the ATM switch 11 (refer to step A5 of FIG. 4).

Thereafter, the ATM cells are received by the cell reception section 31-21 of the LAN interface module 31-2 (refer to (6) in FIG. 3). Consequently, the cell reception section 31-21 activates the cell to frame conversion section 31-22 so that the ATM cells are converted into a LAN frame by the cell to frame conversion section 31-22 (refer to (7) in FIG. 3), and further activates the frame transmission section 31-23 (refer to (8) in FIG. 3) so that the LAN frame is transmitted from the frame transmission section 31-23 to the LAN terminal 31-1 (refer to (9) in FIG. 3).

After the ATM cells are transmitted to the ATM switch 11, the access control section 21-1-22 extracts a LAN interface module (for example, the LAN interface module 21-2-2) to which the access right is to be transferred subsequently in accordance with the access right transfer order read out in accordance with a PVC number from the access right transfer order table T2-1-2 (refer to FIG. 6) of the access control section 21-1-22 (refer to step A6 in FIG. 4), and transmits an access permission message to the thus extracted LAN interface module (refer to step A7 in FIG. 4).

As described above, in the LAN frame switched network of the first embodiment of the present invention, high speed communications which make full use of the bandwidth of the ATM transmission line can be realized without dividing the bandwidth of the ATM transmission line by the connection number of PVCs. This contributes very much to realization of high speed connectionless communications which employ the ATM switch 11. Further, high speed access control is allowed without depending upon a complicated signaling procedure.

c. Second Embodiment

Figure 13:
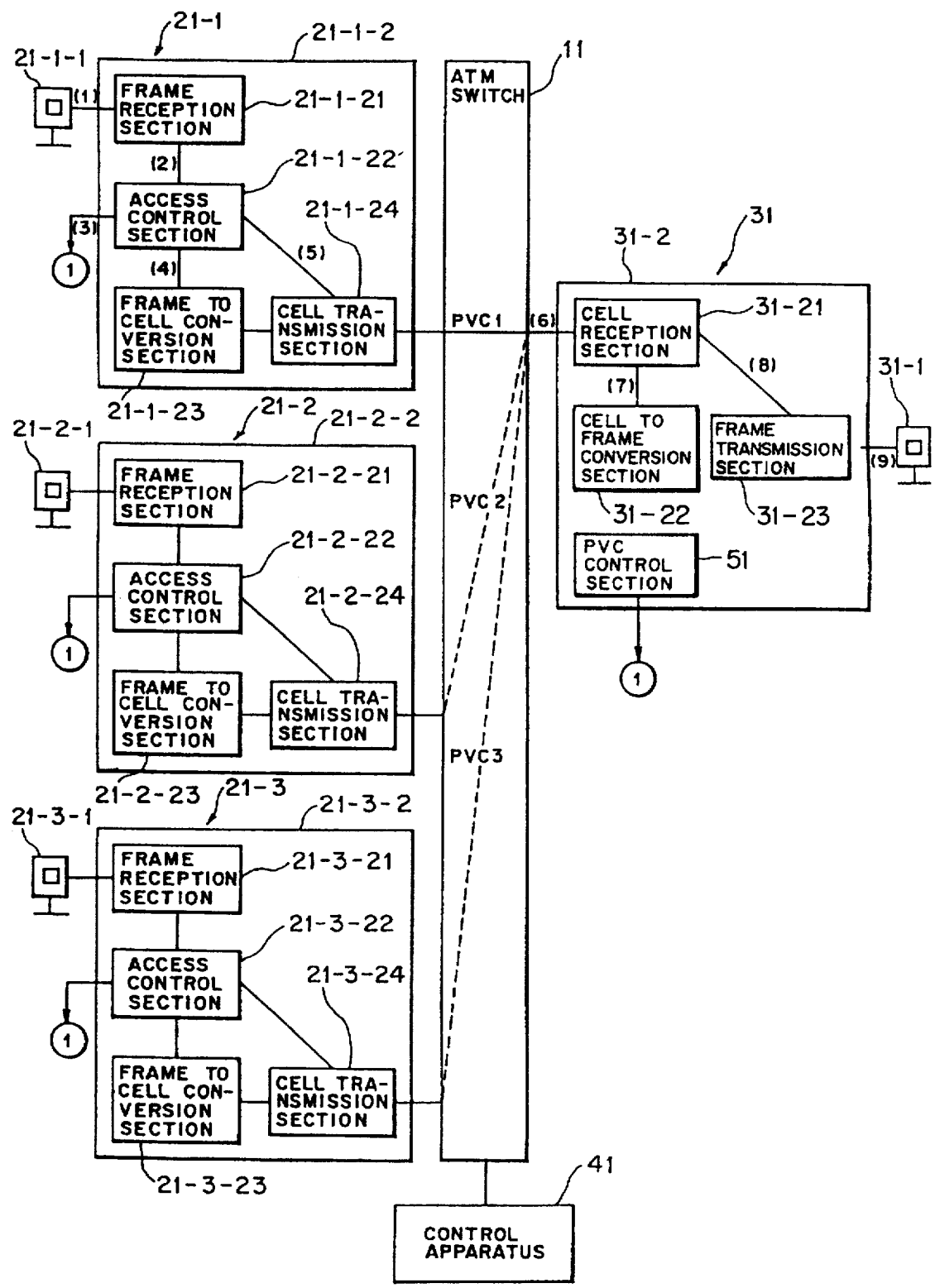
FIG. 13 is a block diagram of another LAN frame switched network showing a second preferred embodiment of the present invention.

Referring now to FIG. 13, there is shown a LAN frame switched network according to a second preferred embodiment of the present invention in which an ATM switch 11, that is, an exchange switch which handles fixed length cells, is employed.

Also in the present LAN frame switched network, a plurality of transmission apparatus 21-1, 21-2 and 21-3 connected to the ATM switch 11 and a reception apparatus 31 connected to the ATM switch 11 are connected to each other by PVC connections by way of the ATM switch 11. Also the ATM switch 11 is controlled by a control apparatus 41.

Each of the transmission apparatus 21-j (here, j =1, 2, 3) includes a LAN terminal 21-j-1 for multimedia and a LAN interface module 21-j-2 similarly as in the LAN frame switched network of the first embodiment described above.

Also the LAN interface module 21-j-2 is constituted similarly from a frame reception section 21-j-21 for receiving a LAN frame, an access control section 21-j-22 for acquiring an access right to a PVC to be used for transmission, a frame to cell conversion section 21-j-23 for converting the LAN frame into ATM cells, and a cell transmission section (cell sending out means) 21-j-24 for transmitting the ATM cells.

Figure 16:
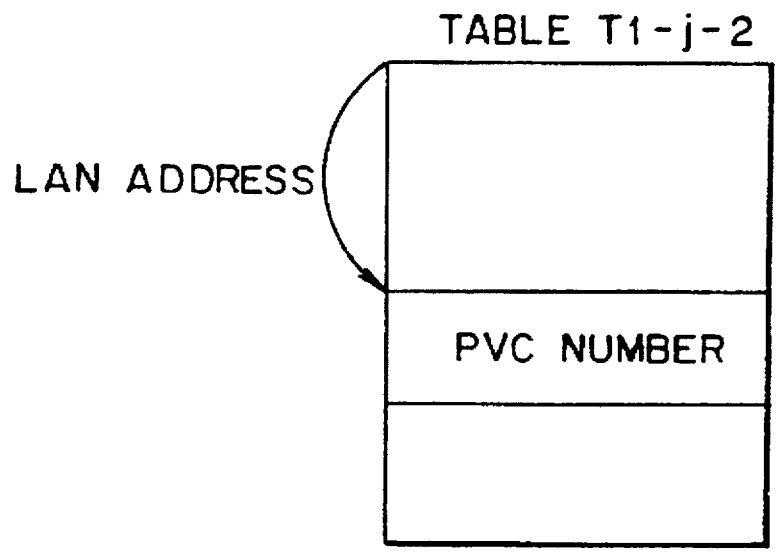
FIG. 16 is a diagrammatic view showing a PVC number table employed in the LAN frame switched network of FIG. 13.

More particularly, the access control section 21-j-22 determines that an access right is acquired when the access right is given from a PVC control section 51 serving as PVC control means provided in the reception apparatus 31 for controlling a right of use of a PVC. The access control section 21-j-22 includes a transmission destination PVC number table T1-j-2 (refer to FIG. 16) for storing a transmission destination PVC number.

Accordingly, the access control section 21-j-22 of the LAN frame switched network in the present embodiment has a function of access right acquisition determination means for determining that an access right is acquired when the access right is given from the PVC control section 51 provided in the reception apparatus 31.

Consequently, a transmission apparatus 21-j which has acquired the access right to the PVC to be used can perform transmission to the reception apparatus 31 using a desired transmission line bandwidth.

Meanwhile, also the reception apparatus 31 is constituted from a LAN terminal 31-1 for multi-media corresponding to the LAN terminals 21-j-1 and a LAN interface module 31-2.

The LAN interface module 31-2 receives a cell signal from the ATM switch 11, converts the cell signal back into a frame signal and sends the frame signal to the LAN terminal 31-1 accommodated in the LAN interface module 31-2, and further controls a right of use of the PVC. To this end, the LAN interface module 31-2 is constituted from a cell reception section (cell reception means) 31-21 for receiving ATM cells, a cell to frame conversion section 31-22 for converting the ATM cells into a LAN frame, and a frame transmission section 31-23 for transmitting the LAN frame, as well as the PVC control section 51 for controlling the right of use of the PVC as described above.

Figure 17:
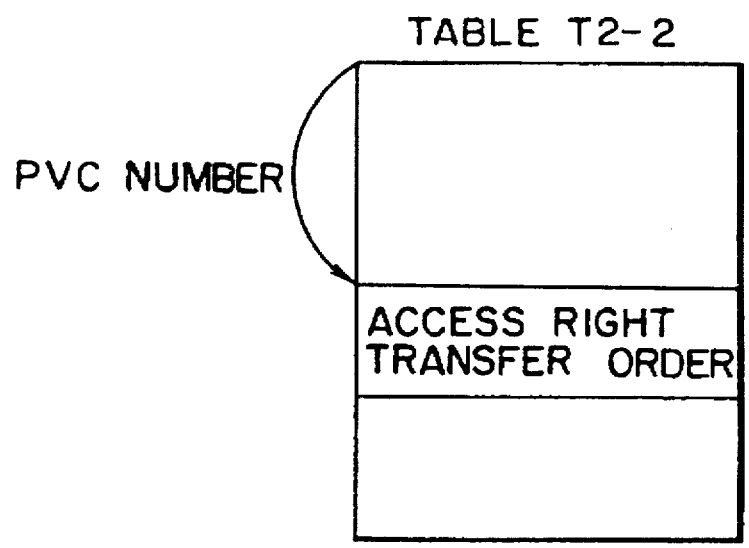
FIG. 17 is a similar view but showing an access right transfer order table employed in the LAN frame switched network of FIG. 13.
Figure 18:
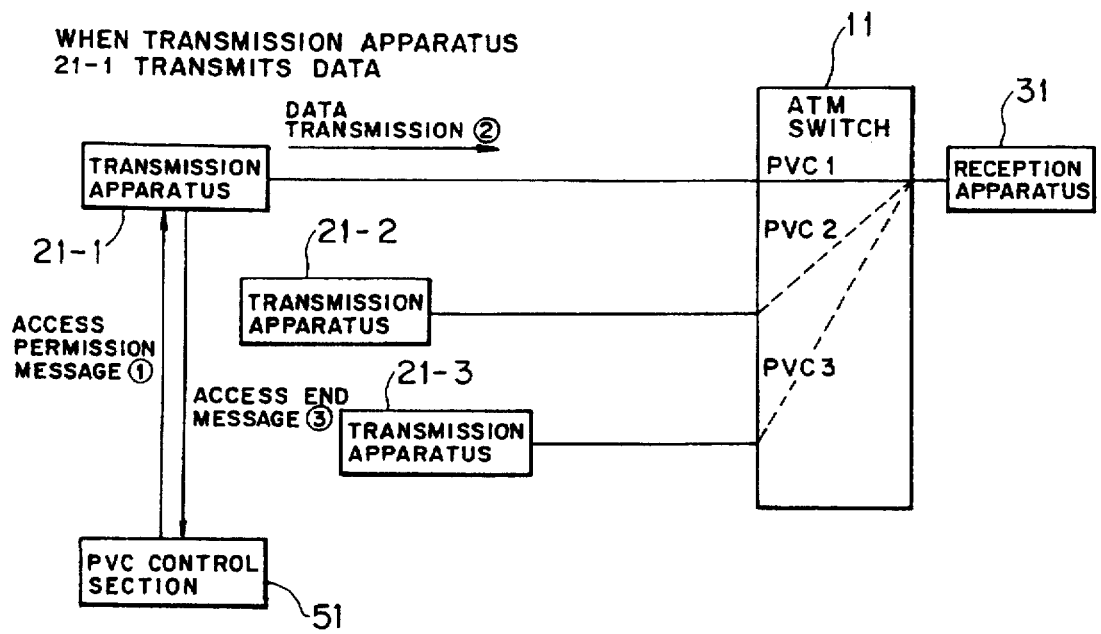
FIGS. 18 to 20 are block diagrams illustrating operation of the LAN frame switched network of FIG. 13.
Figure 19:
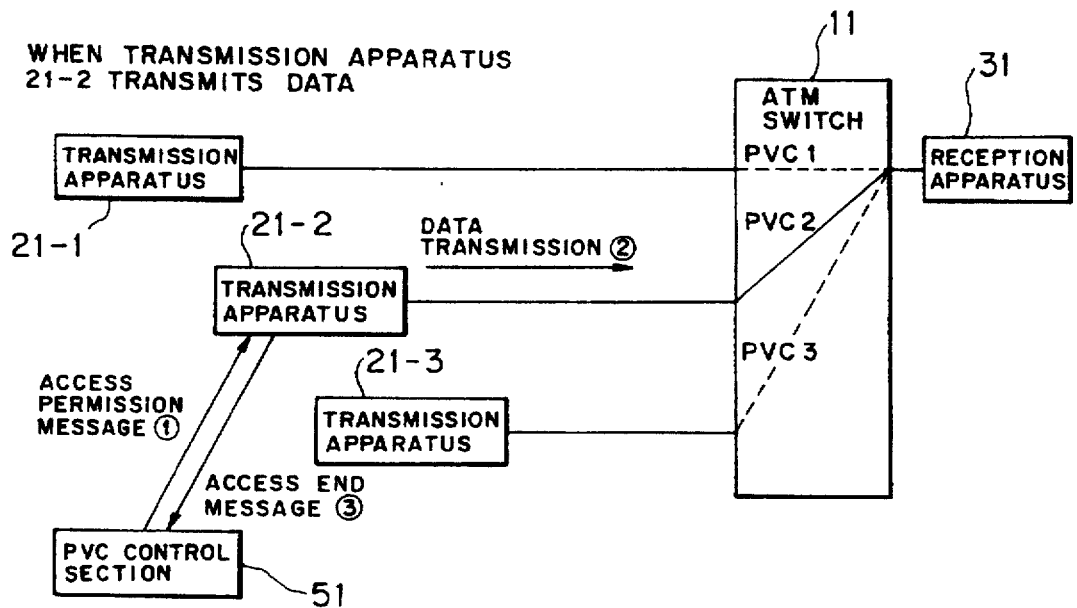
Figure 20:
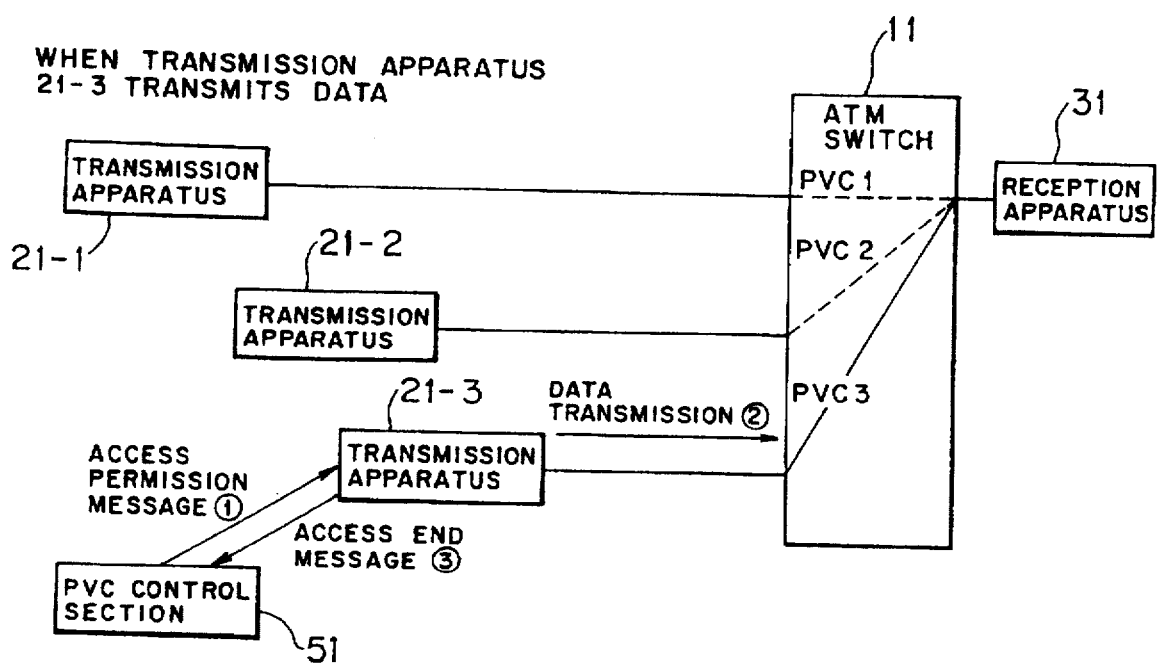

The PVC control section 51 successively gives the access right to the plurality of transmission apparatus 21-j to control the PVC use right. The PVC control section 51 includes an access right transfer order table T2-2 (refer to FIG. 17) in which an access right transfer order is stored.

It is to be noted that, similarly as in the ATM frame switched network of the first embodiment, the LAN interface modules 21-i-2 are connected to the ATM switch 11 and accommodate the respective LAN terminals 21-j-1 as described above and the LAN interface modules 21-j-2 on the transmission side and the LAN interface module 31-2 on the reception side are connected to each other by way of PVCs PVC1, PVC2 and PVC3, respectively.

In the communication system in the second embodiment having the construction described above, in order to acquire the access right to the PVC, processing of transmitting an access permission message from the PVC control section 51 to a transmission apparatus 21-j in advance and then transmitting the access permission message from the PVC control section 51 to a next transmission apparatus after the PVC control section 51 receives a message (access end message) representative of completion of accessing to the PVC is performed sequentially and repetitively for the transmission apparatus 21-1 to 21-3, for example, in the order of the transmission apparatus 21-1 → transmission apparatus 21-2 → transmission apparatus 21-3 " transmission apparatus 21-1 . . . , and when a transmission apparatus 21-j tries to transmit data, the access control section 21-j-22 in the transmission apparatus 21-j first waits until the access permission message is received from the PVC control section 51, and then data are transmitted. Then, after completion of transmission of the data, an access end message is transmitted to the PVC control section 51.

Consequently, access control can be realized with a simple signaling procedure. Further, since control of the PVCs (PVC1 to PVC3) which are used switchably is effected in a concentrated manner by the PVC management section 51, processing of a countermeasure against a trouble or the like can be realized readily.

It is to be noted that, also in this instance, any of the bandwidths A, B and C of the PVCs PVC1, PVC2 and PVC3 can use a bandwidth independently within a range which does not exceed the bandwidth D of the ATM transmission line. That is, $A \leq D$, $B \leq D$ and $C \leq D$.

Operation of the LAN frame switched network in the present embodiment will be described subsequently with reference to FIGS. 13 to 17. Also in the present LAN frame switched network, when data are to be transmitted, for example, from the LAN terminal 21-1-1 to the LAN terminal 31-1, data (a LAN frame) transmitted from the LAN terminal 21-1-1 are received by the frame reception section 21-1-21 of the LAN interface module 21-1-2 (refer to (1) in FIG. 13 and step B1 in FIG. 14).

Upon reception of the frame, the frame reception section 21-1-21 notifies reception of the frame to the access control section 21-1-22 (refer to (2) in FIG. 13).

The access control section 21-1-22 of the LAN interface module 21-1-2 extracts a transmission destination PVC from a LAN address in the received frame using the transmission destination PVC number table T1-1-2 (refer to FIG. 16) of the access control section 21-1-22 (refer to step B2 in FIG. 14) and discriminates that the frame is destined for the LAN 14). Then, the access control section 21-1-22 communicates messages with the PVC control section 51 in the reception apparatus 31 to acquire the access right (refer to (3) in FIG. 13). In this instance, when the access control section 21-1-22 is given the access right from the PVC control section 51, it determines that it acquires the access right (refer to step B3 in FIG. 14).

Figure 14:
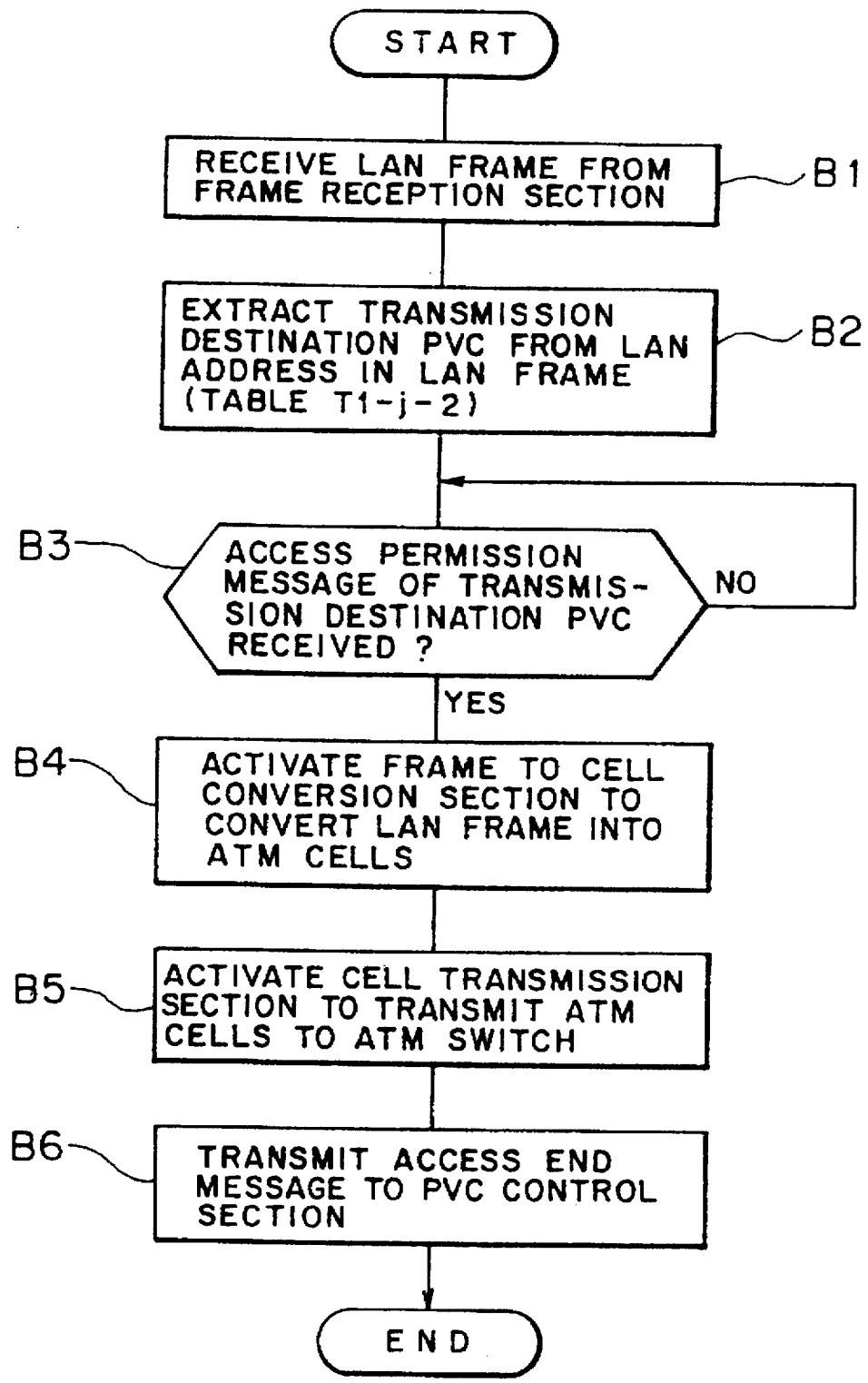
FIGS. 14 and 15 are flow charts illustrating operation of the LAN frame switched network of FIG. 13.

After the access right is acquired in this manner, the access control section 21-1-22 of the LAN interface module 21-1-2 activates the frame to cell conversion section 21-1-23 so that the LAN frame is converted into ATM cells by the frame to cell conversion section 21-1-23 (refer to (4) in FIG. 13 and step B4 in FIG. 14). Further, the access control section 21-1-22 activates the cell transmission section 21-1-24 (refer to (S) in FIG. 13) so that the ATM cells are transmitted from the cell transmission section 21-1-24 to the ATM switch 11 (refer to step B5 of FIG. 14).

Thereafter, the ATM cells are received by the cell reception section 31-21 of the LAN interface module 31-2 (refer to (6) in FIG. 13). Consequently, the cell reception section 31-21 activates the cell to frame conversion section 31-22 so that the ATM cells are converted into a LAN frame by the cell to frame conversion section 31-22 (refer to (7) in FIG. 13), and further activates the frame transmission section 31-23 (refer to (8) in FIG. 13) so that the LAN frame is transmitted from the frame transmission section 31-23 to the LAN terminal 31-1 (refer to (9) in FIG. 13).

After the ATM cells are transmitted to the switch 11, the access control section 21-1-22 transmits an access end message to the PVC control section 51 (refer to step B6 in FIG. 14).

Figure 15:
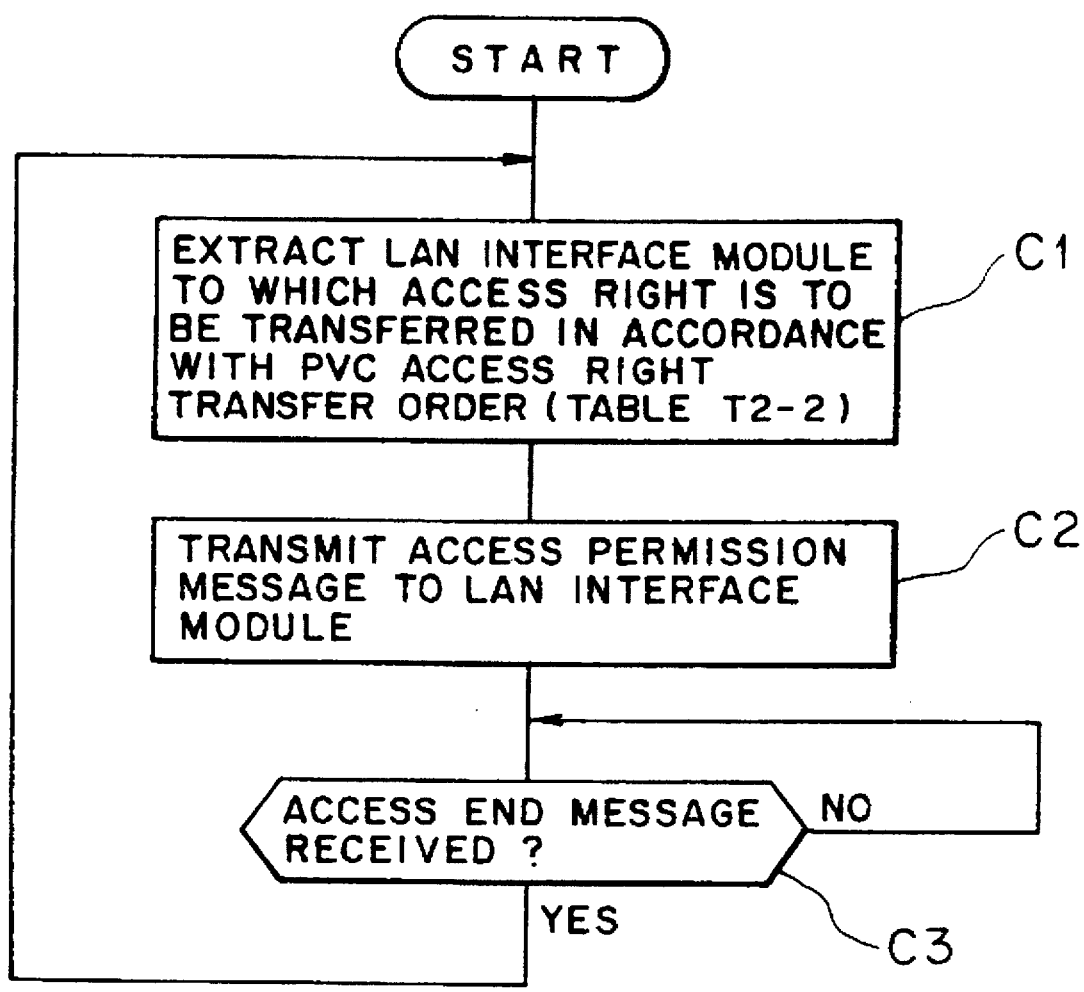

It is to be noted that the PVC control section 51 extracts a LAN interface module (for example, the LAN interface module 21-2-2) to which the access right is to be transferred subsequently in accordance with the access right transfer order read out based on a PVC number from the access right transfer order table T2-2 (refer to FIG. 17) of the PVC control section 51 (refer to step C1 in FIG. 15), and transmits an access permission message to the thus extracted LAN interface module (refer to step C2 in FIG. 15). Then, the PVC control section 51 enters an access end message waiting condition for waiting an access end message from the access control section (step C3 in FIG. 15). If an access end message is thereafter received from the access control section, then the processing beginning with step C1 described above is repeated again.

In this manner, also in the LAN frame switched network of the second embodiment of the present invention, high speed communications which make full use of the bandwidth of the ATM transmission line can be realized without dividing the bandwidth of the ATM transmission line by the connection number of PVCs. This contributes very much to realization of high speed connectionless communications which employ the ATM switch 11. Further, access control can be realized with a simple signaling procedure. Furthermore, since control of the PVCs (PVC1 to PVC3) which are used switchably is effected in a concentrated manner by the PVC control section 51, processing of a countermeasure against a trouble or the like can be realized readily.

Figure 21:
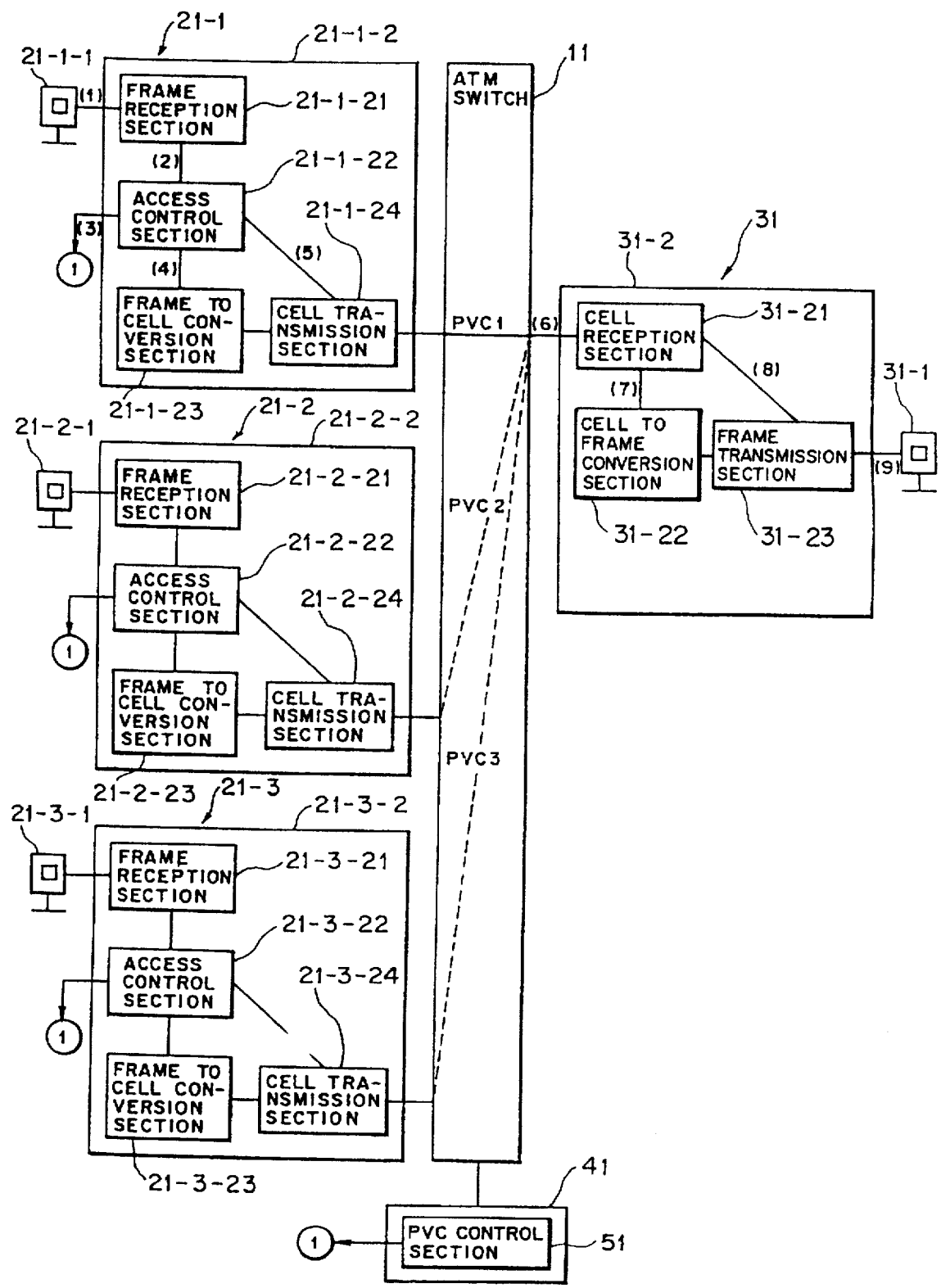
FIG. 21 is a block diagram showing a modification to the LAN frame switched network of FIG. 13.

It is to be noted that the. PVC control section 51 for controlling the right of use of the PVC may alternatively be provided in the control apparatus 41 as shown in FIG. 21. The PVC control section 51 controls the right of use of the PVC not only with regard to the particular reception apparatus but also with regard to any reception apparatus accommodated in the switch. Also in this instance, the PVC control section 51 includes an access right transfer order table T2-2 (of a construction similar to that shown in FIG. 17) in which an access right transfer order is stored.

The other construction and operation of the modified ATM frame switched network shown in FIG. 21 are similar to those of the ATM frame switched network of the second embodiment shown in FIG. 13.

In particular, in order to acquire the access right to the PVC, processing of transmitting an access permission message from the PVC control section 51 to a transmission apparatus 21-j in advance and then transmitting the access permission message from the PVC control section 51 to a next transmission apparatus after the PVC control section 51 receives a message (access end message) representative of completion of accessing to the PVC is performed sequentially and repetitively, and when a transmission apparatus 21-j tries to transmit data, the access control section 21-j-22 in the transmission apparatus 21-j first waits until the access permission message is received from the PVC control section 51, and then data are transmitted. Then, after completion of transmission of the data, an access end message is transmitted to the PVC control section 51.

Consequently, access control can be realized with a simple signaling procedure. Further, since control of the PVCs (PVC1 to PVC3) which are used switchably is effected in a concentrated manner by the PVC management section 51, processing of a countermeasure against a trouble or the like can be realized readily.

d. Third Embodiment

Figure 22:
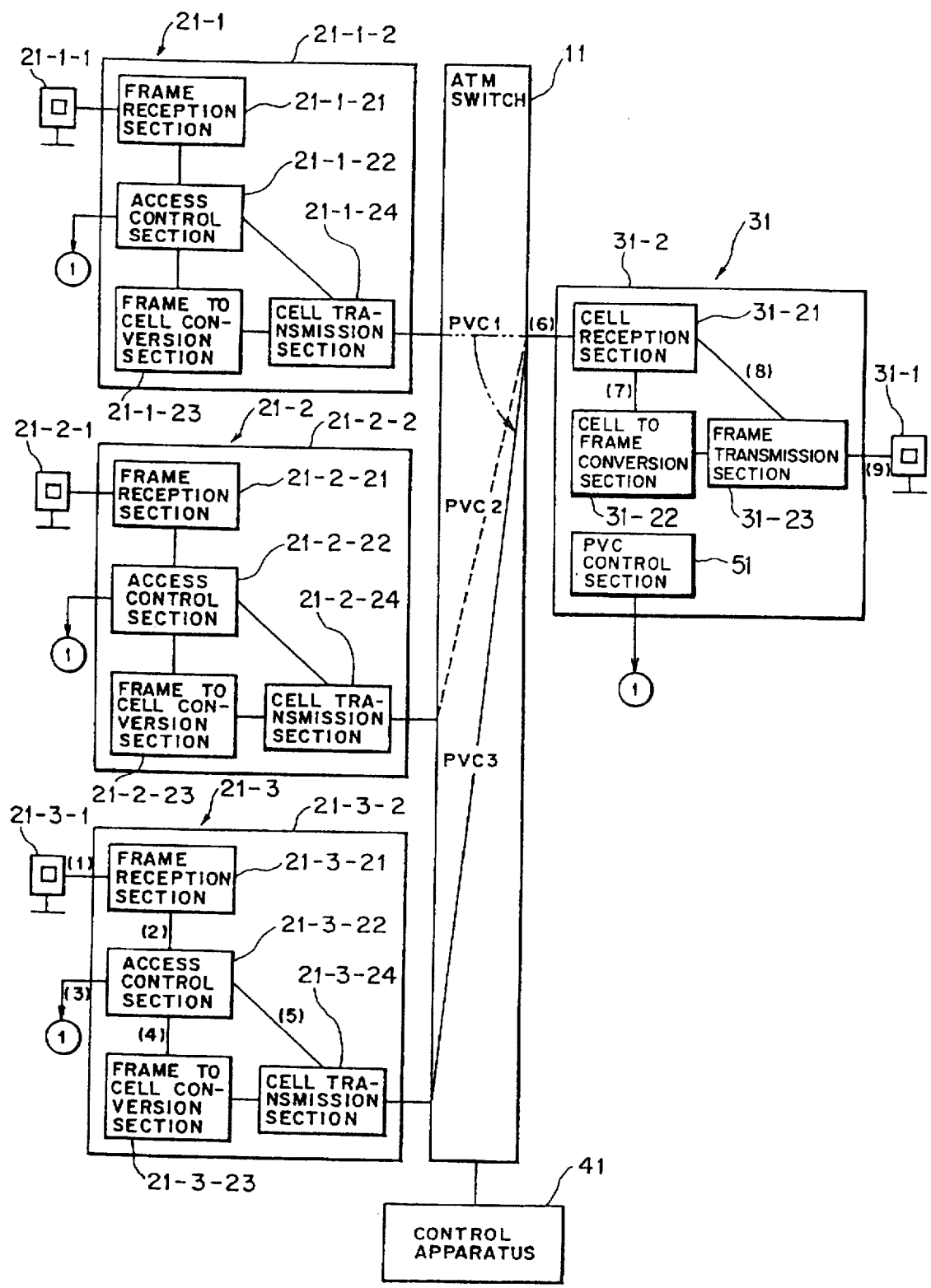
FIG. 22 is a block diagram of a further LAN frame switched network showing a third preferred embodiment of the present invention.

Referring now to FIG. 22, there is shown a LAN frame switched network according to a third preferred embodiment of the present invention in which an ATM switch 11, that is, an exchange switch which handles fixed length cells, is employed.

Also in the LAN frame switched network shown in FIG. 22, a plurality of transmission apparatus 21-1, 21-2 and 21-3 connected to the ATM switch 11 and a reception apparatus 31 connected to the ATM switch 11 are connected to each other by PVC connections by way of the ATM switch 11. Also the ATM switch 11 is controlled by a control apparatus 41.

Each of the transmission apparatus 21-j (here, j =1, 2, 3) includes a LAN terminal 21-j-1 for multimedia and a LAN interface module 21-j-2 similarly as in the LAN frame switched networks of the first and second embodiments described above.

Also the LAN interface module 21-j-2 is constituted similarly from a frame reception section 21-j-21 for receiving a LAN frame, an access control section 21-j-22 for acquiring an access right to a PVC to be used for transmission, a frame to cell conversion section 21-j-23 for converting the LAN frame into ATM cells, and a cell transmission section (cell sending out means) 21-j-24 for transmitting the ATM cells.

Figure 25:
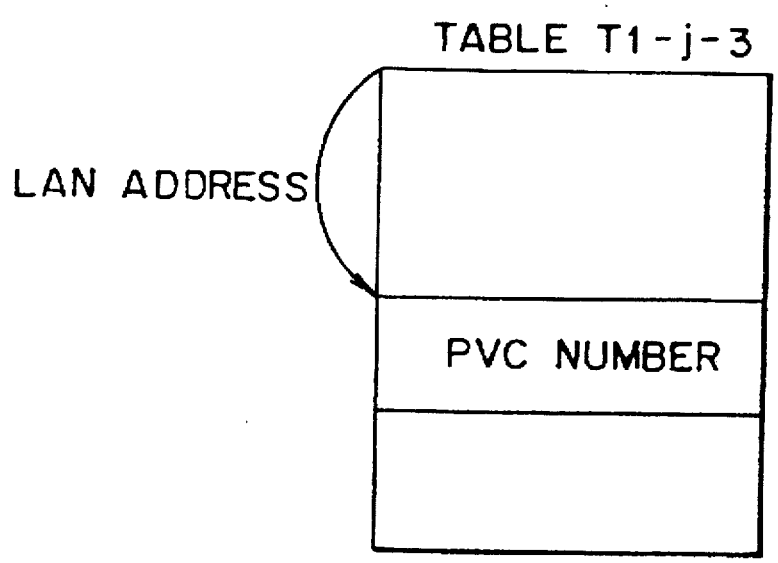
FIG. 25 is a diagrammatic view showing a PVC number table employed in the LAN frame switched network of FIG. 22.

More particularly, the access control section 21-j-22 determines that an access right is acquired when it makes an inquiry, upon starting of communications with the reception apparatus 31, for an access right to a PVC to a PVC control section 51 serving as PVC control means provided in the reception apparatus 31 for controlling a right of use of a PVC and is given the access right by the PVC control section 51. The access control section 21-j-22 includes a transmission destination PVC number table T1-j-3 (refer to FIG. 25) for storing a transmission destination PVC number.

Accordingly, the access control section 21-j-22 of the LAN frame switched network in the present embodiment has a function of access right acquisition determination means for determining that an access right is acquired when the access right is given by the PVC control section 51 in response to an inquiry to the PVC control section 51 upon starting of communications with the reception apparatus 31.

Consequently, a transmission apparatus 21-j which has acquired the access right to the PVC to be used can perform transmission to the reception apparatus 31 using a desired transmission line bandwidth.

Meanwhile, also the reception apparatus 31 is constituted from a LAN terminal 31-1 for multi-media corresponding to the LAN terminals 21-j-1 and a LAN interface module 31-2.

The LAN interface module 31-2 receives a cell signal from the ATM switch 11, converts the cell signal back into a frame signal and sends the frame signal to the LAN terminal 31-1 accommodated in the LAN interface module 31-2, and further controls a right of use of a PVC. To this end, the LAN interface module 31-2 is constituted from a cell reception section (cell reception means) 31-21 for receiving ATM cells, a cell to frame conversion section 31-22 for converting the ATM cells into a LAN frame, and a frame transmission section 31-23 for transmitting the LAN frame, as well as the PVC control section 51 for controlling the right of use of the PVC as described above.

The PVC control section 51 gives the access right to the plurality of transmission apparatus 21-j in response to inquiry information for acquisition of an access right, which is sent to it when the plurality of transmission apparatus 21-j intend to start communications with the reception apparatus 31, to control a PVC use right. More particularly, the PVC control section 51 performs access right giving processing in accordance with a predetermined preferential order condition when the PVC connected to the reception apparatus 31 is busy.

In this instance, the access right giving processing which is performed in accordance with the predetermined preferential order condition by the PVC control section 51 may be such as follows. In particular, when the PVC connected to the reception apparatus 31 is busy, the PVC control section 51 waits, and then after the PVC is released, the PVC control section 51 gives the access right to a transmission apparatus in a waiting condition. Or alternatively, when the PVC connected to the reception apparatus 31 is busy, the PVC control section 51 sends back to the transmission apparatus a message of rejection to give the access right.

Figure 26:
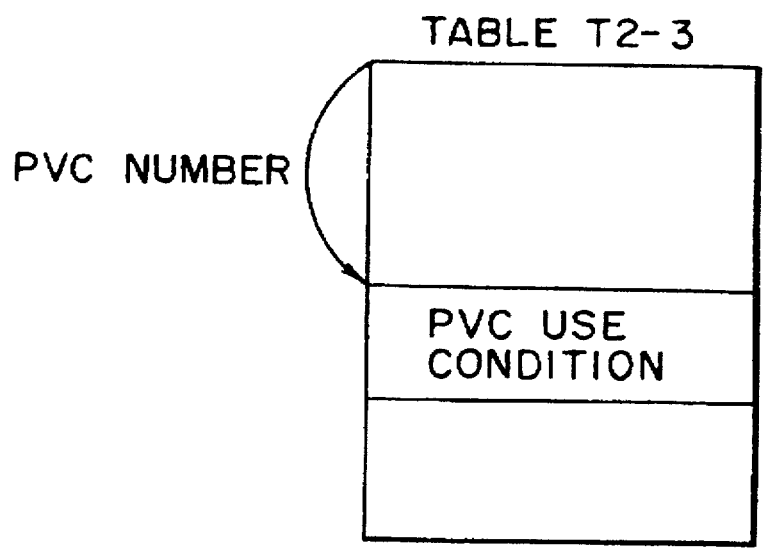
FIG. 26 is a similar view but showing a PVC use condition table employed in the LAN frame switched network of FIG. 22.

The PVC control section 51 includes a PVC use condition table T2-3 (refer to FIG. 26) in which a PVC use condition is stored.

Further, the LAN interface modules 21-j-2 are connected to the ATM switch 11 and accommodate the respective LAN terminals 21-j-1 as described above and the LAN interface modules 21-j-2 at the transmission side and the LAN interface module 31-2 at the reception side are connected to each other by way of PVCs PVC1, PVC2 and PVC3, respectively, similarly to in the LAN frame switched networks of the first and second embodiments described hereinabove.

Figure 27:
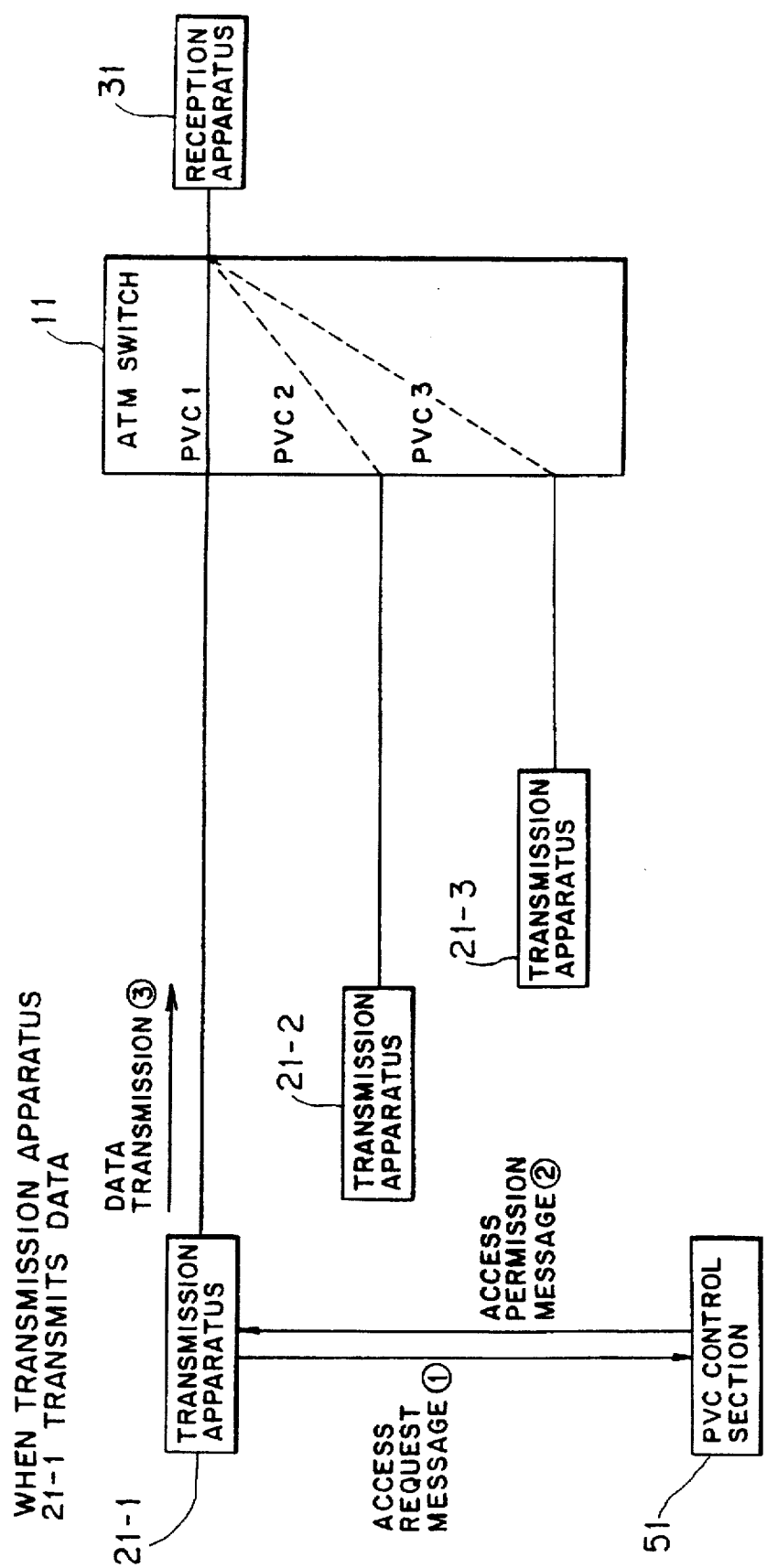
FIGS. 27 and 28 are block diagrams illustrating operation of the LAN frame switched network of FIG. 22.
Figure 28:
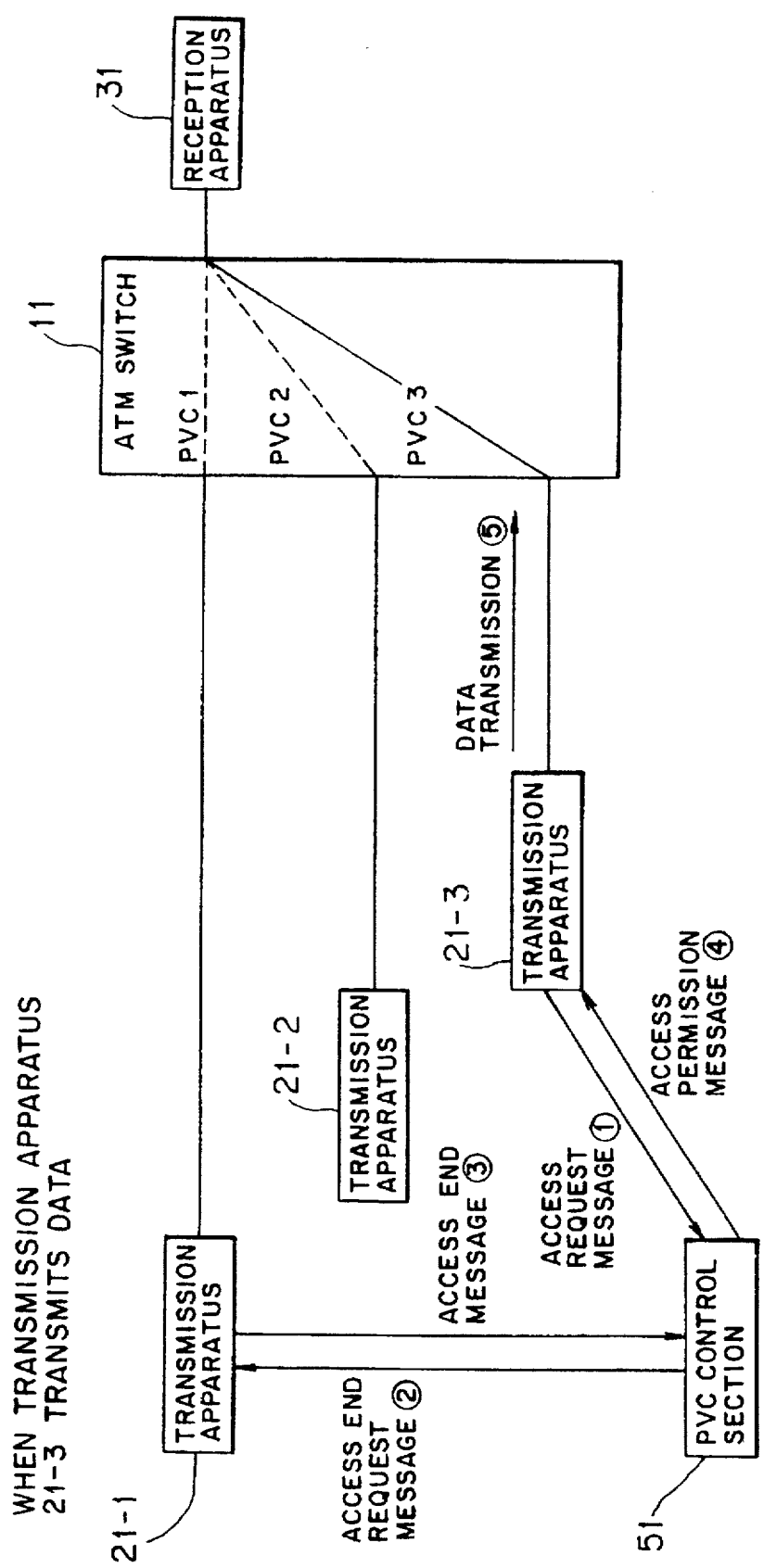

In the communication system of the third embodiment having the construction described above, in order to acquire the access right to the PVC, before a transmission apparatus 21-j transmits data, it transmits a message (access request message) requesting the right of use of the PVC to the PVC control section 51 and then transmits the data after it waits until it receives an access permission message from the PVC control section 51 as seen from FIGS. 27 and 28.

Figure 29:
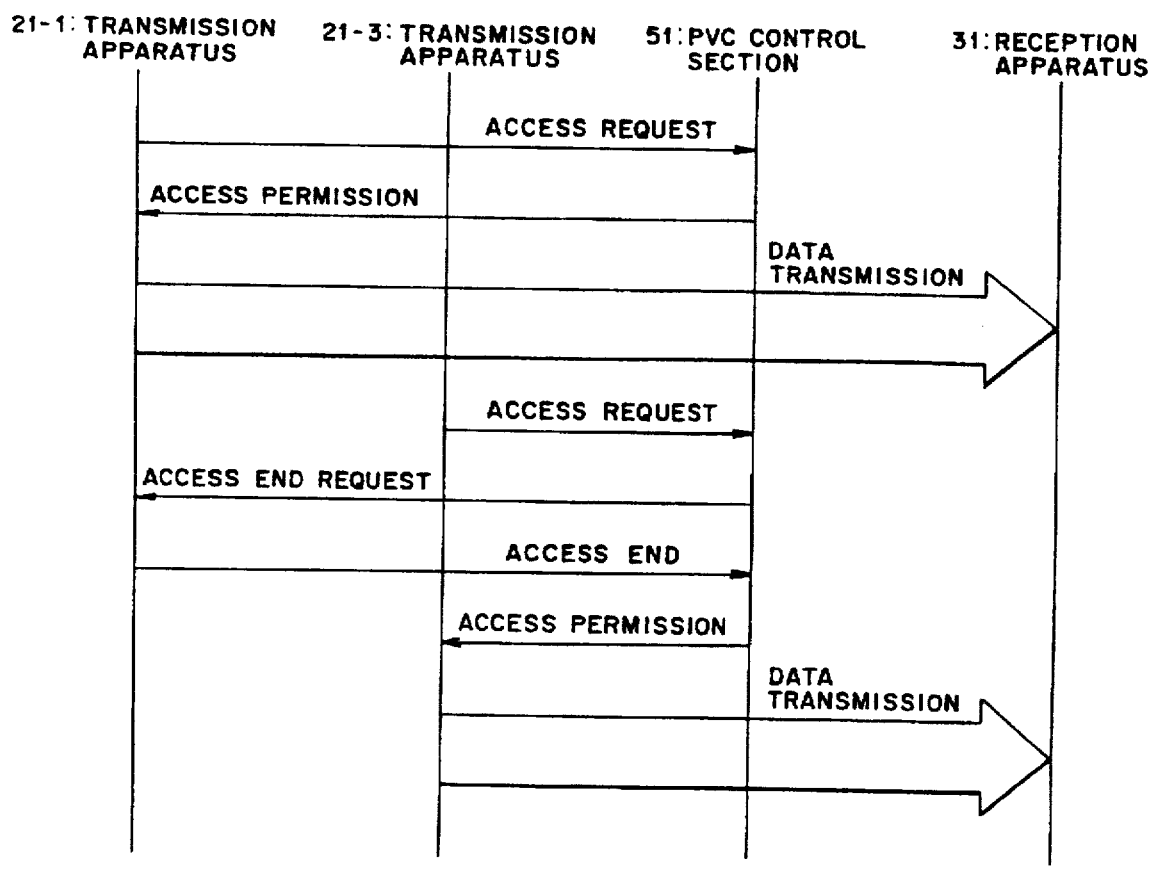
FIG. 29 is a signal sequence diagram illustrating operation of the LAN frame switched network of FIG. 22.

Upon reception of the access request message from the transmission apparatus 21-j, the PVC control section 51 determines whether or not the requested PVC is busy. Then, when the PVC is free, the PVC control section 51 transmits an access permission message. But on the contrary when the PVC is busy, the PVC control section 51 puts the transmission apparatus, which has made the request, into a queuing condition. Then, the PVC control section 51 transmits, to another transmission apparatus by which the PVC is used, a message (access end request message) requesting release of the right of use of the PVC. Then, after the PVC control section 51 receives an access end message from the last-mentioned transmission apparatus, it transmits an access permission message to the transmission apparatus which has made the request for access. Flows of the messages and flows of data in this instance are illustrated in FIG. 29.

It is to be noted that, when the PVC is busy in this instance, different processing may be performed in place of transmitting a message (access end request message) requesting release of the right of use of the PVC to the apparatus by which the PVC is used, such as, for example, putting the transmission apparatus, which has made the request for transmission, into a queuing condition.

Accordingly, once a transmission apparatus acquires the access right, it can hold the access right unless another apparatus uses the PVC. Consequently, transmission of data can be performed continuously without performing access control.

Figure 30:
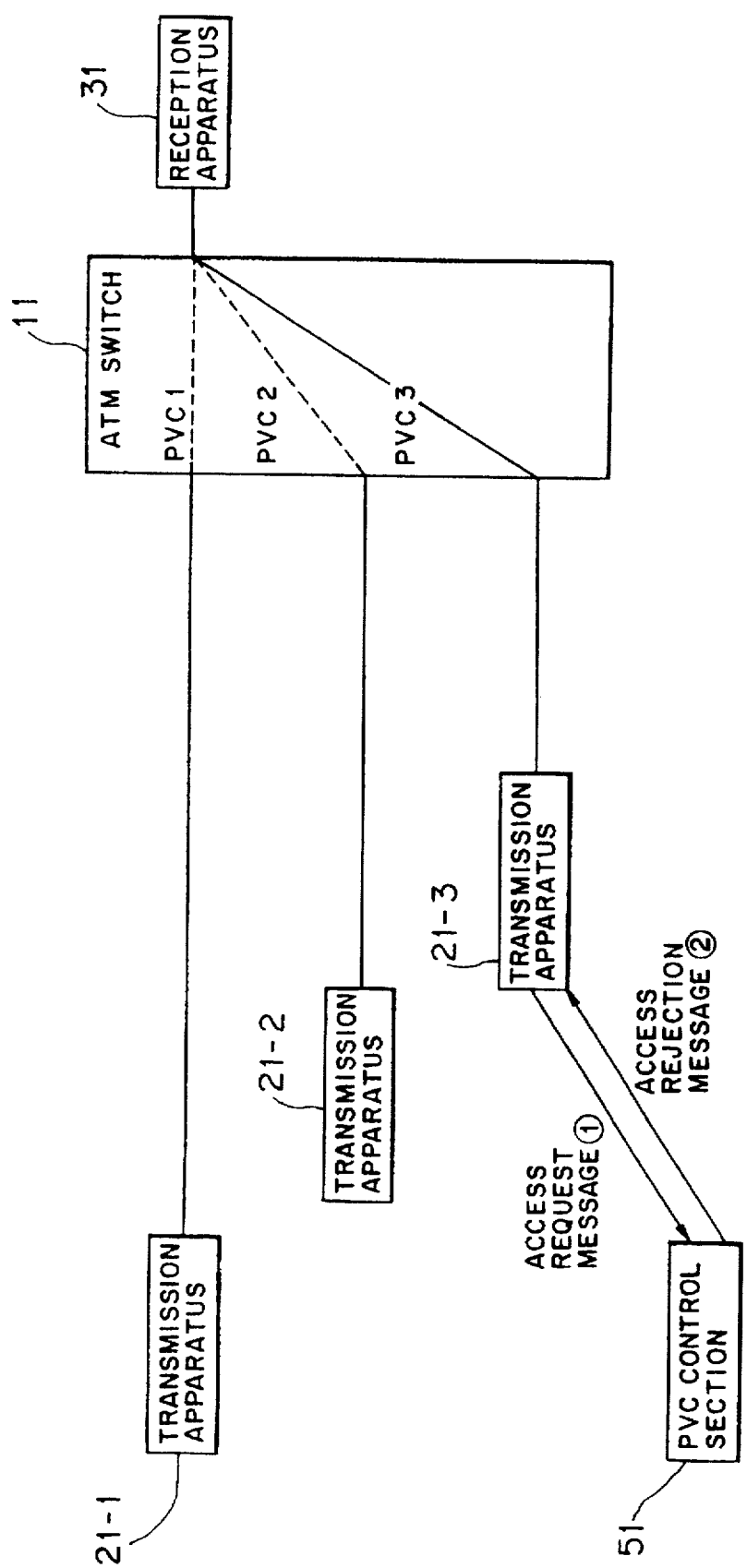
FIG. 30 is a block diagram illustrating operation of the LAN frame switched network of FIG. 22.
Figure 31:
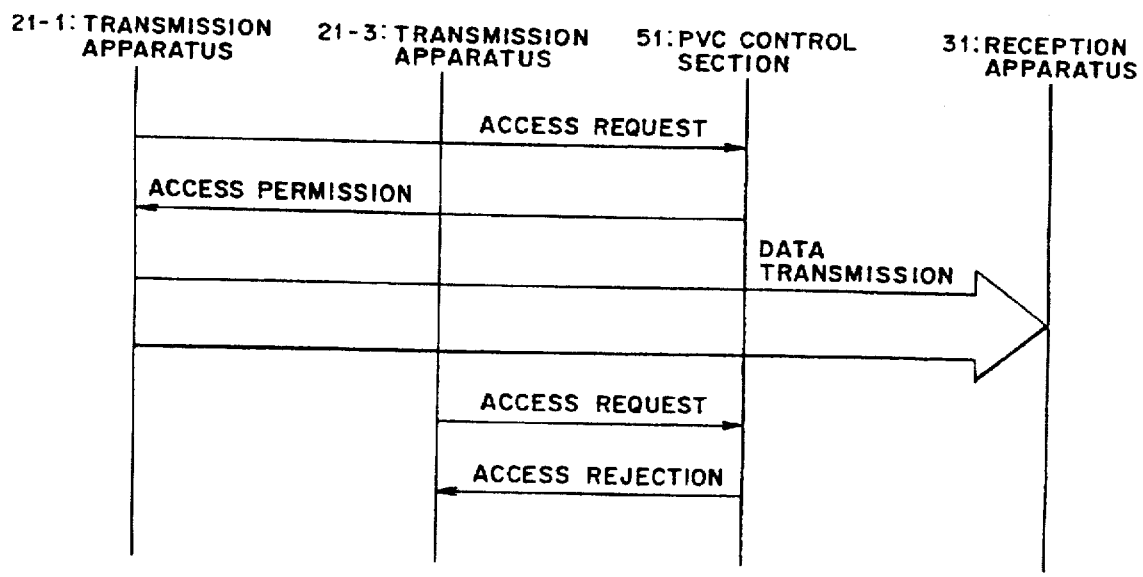
FIG. 31 is a signal sequence diagram illustrating operation of the LAN frame switched network of FIG. 22.

On the other hand, depending upon a processing condition for a transmission apparatus which has made an inquiry, the PVC control section 51 determines, when it receives an access request message from a transmission apparatus 21-j, whether or not the PVC thus requested is busy, and transmits an access permission message when the PVC is free, but when the PVC is busy, the PVC control section 51 transmits an access rejection message as seen from FIG. 30. Flows of the messages and flows of data in this instance are illustrated in FIG. 31.

Accordingly, in this instance, once a transmission apparatus acquires the access right, it can hold the access right with certainty unless another transmission apparatus uses the PVC, and transmission of data can be performed continuously without performing access control.

It is to be noted that, also in those instances, any of the bandwidths A, B and C of the PVCs PVC1, PVC2 and PVC3 can use a bandwidth independently within a range which does not exceed the bandwidth D of the ATM transmission line. That is, $A \leq D$, $B \leq D$ and $C \leq D$.

Operation of the LAN frame switched network in the present embodiment will be described subsequently with reference to FIGS. 22 to 26. Here, a case wherein the LAN terminal 21-1-3 makes an inquiry for communication with the LAN terminal 31-1 while the LAN terminal 21-1-1 and the LAN terminal 31-1 are communicating with each other is considered. Data (a LAN frame) transmitted from the LAN terminal 21-1-3 are received by the frame reception section 21-3-21 of the LAN interface module 21-3-2 (refer to (1) in FIG. 22 and step D1 in FIG. 23).

Upon reception of the frame, the frame reception section 21-3-21 notifies reception of the frame to the access control section 21-3-22 (refer to (2) in FIG. 2).

Figure 23:
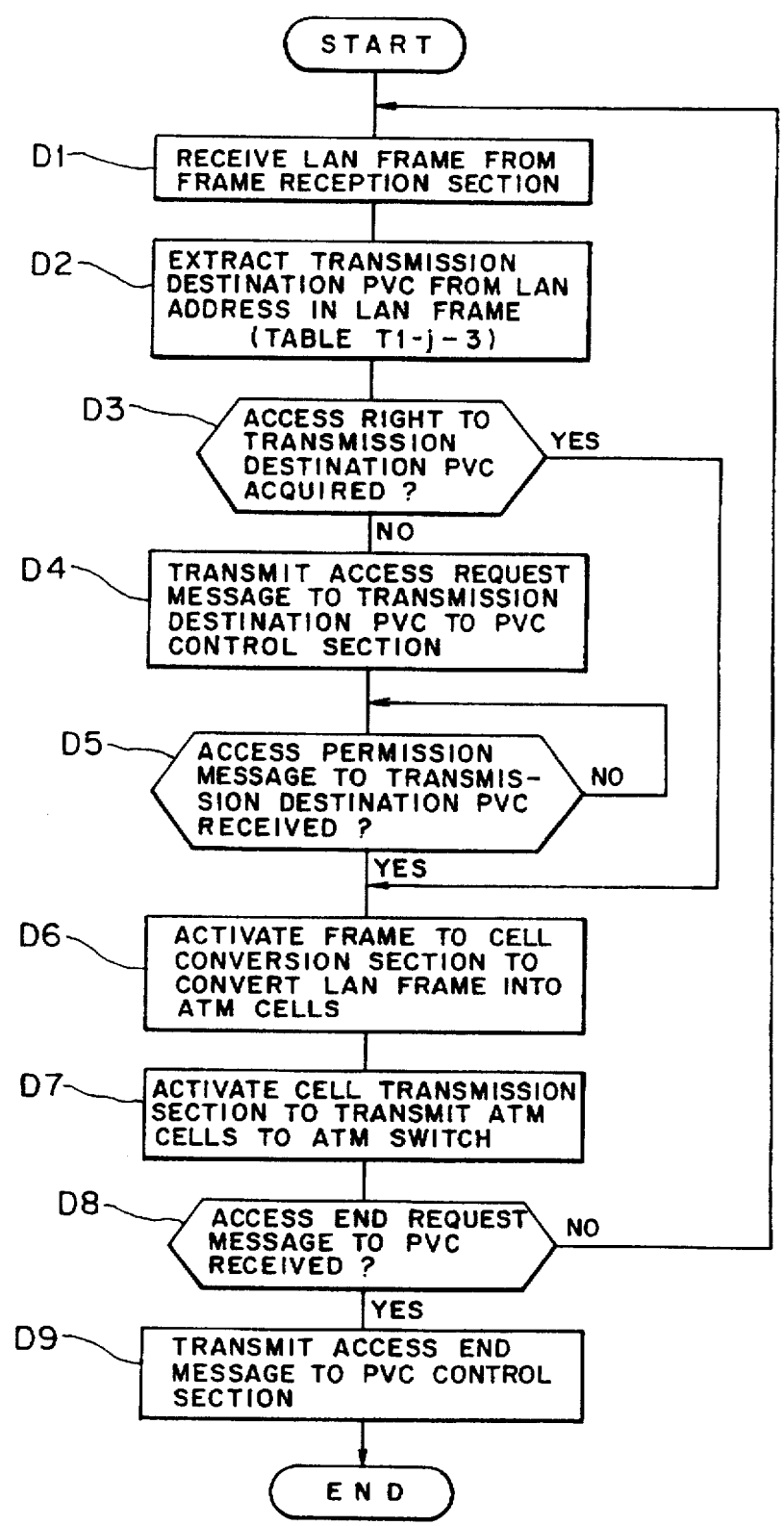
FIGS. 23 and 24 are flow charts illustrating operation of the LAN frame switched network of FIG. 22.

The access control section 21-3-22 of the LAN interface module 21-3-2 extracts a transmission destination PVC from a LAN address in the received frame using the transmission destination PVC number table T1-3-3 (refer to FIG. 25) of the access control section 21-3-22 (refer to step D2 in FIG. 23) and determines whether or not the access right is acquired already for the thus extracted transmission destination PVC (refer to step D3 in FIG. 23).

If the access right is not acquired, the access control section 21-3-22 sends out to the PVC control section 51 an access request message to the extracted transmission destination PVC to make an inquiry (refer to step D4 in FIG. 23). Thereafter, the access control section 21-3-22 watches reception of an access permission message to the transmission destination PVC from the PVC control section 51 (refer to step D5 in FIG. 23), and upon reception of an access permission message from the PVC control section 51, the access control section 21-3-22 determines that an access right is acquired (refer to (3) in FIG. 22).

After the access right is acquired in this manner, the access control section 21-3-22 of the LAN interface module 21-3-2 activates the frame to cell conversion section 21-3-23 so that the LAN frame is converted into ATM cells by the frame to cell conversion section 21-3-23 (refer to (4) in FIG. 22 and step D6 in FIG. 23). Further, the access control section 21-3-22 activates the cell transmission section 21-3-24 (refer to (5) in FIG. 22) so that the ATM cells are transmitted from the cell transmission section 21-3-24 to the ATM switch 11 (refer to step D7 of FIG. 23).

It is to be noted that, when it is determined at step D3 that the access right to the extracted transmission destination PVC is acquired already, the processing at step D6 is performed subsequently.

Thereafter, the ATM cells are received by the cell reception section 31-21 of the LAN interface module 31-2 (refer to (6) in FIG. 22). Consequently, the cell reception section 31-21 activates the cell to frame conversion section 31-22 so that the ATM cells are converted into a LAN frame by the cell to frame conversion section 31-22 (refer to (7) in FIG. 22), and further activates the frame transmission section 31-23 (refer to (8) in FIG. 22) so that the LAN frame is transmitted from the frame transmission section 31-23 to the LAN terminal 31-1 (refer to (9) in FIG. 22).

After the ATM cells are transmitted to the ATM switch 11, the access control section 21-3-22 determines whether or not an access end request message for the PVC is received from the PVC control section 51 (refer to step D8 of FIG. 23), and if the access end request message is received, the access control section 21-3-22 transmits an access end message to the PVC control section 51 (refer to step D9 in FIG. 23).

It is to be noted that, until after the access end request message for the PVC is received from the PVC control section 51, the route of NO at step D8 is taken to repeat the processing beginning with step D1. This signifies that, once a transmission apparatus acquires the access right, it continues to hold the access right with certainty unless another transmission apparatus uses the PVC.

Figure 24:
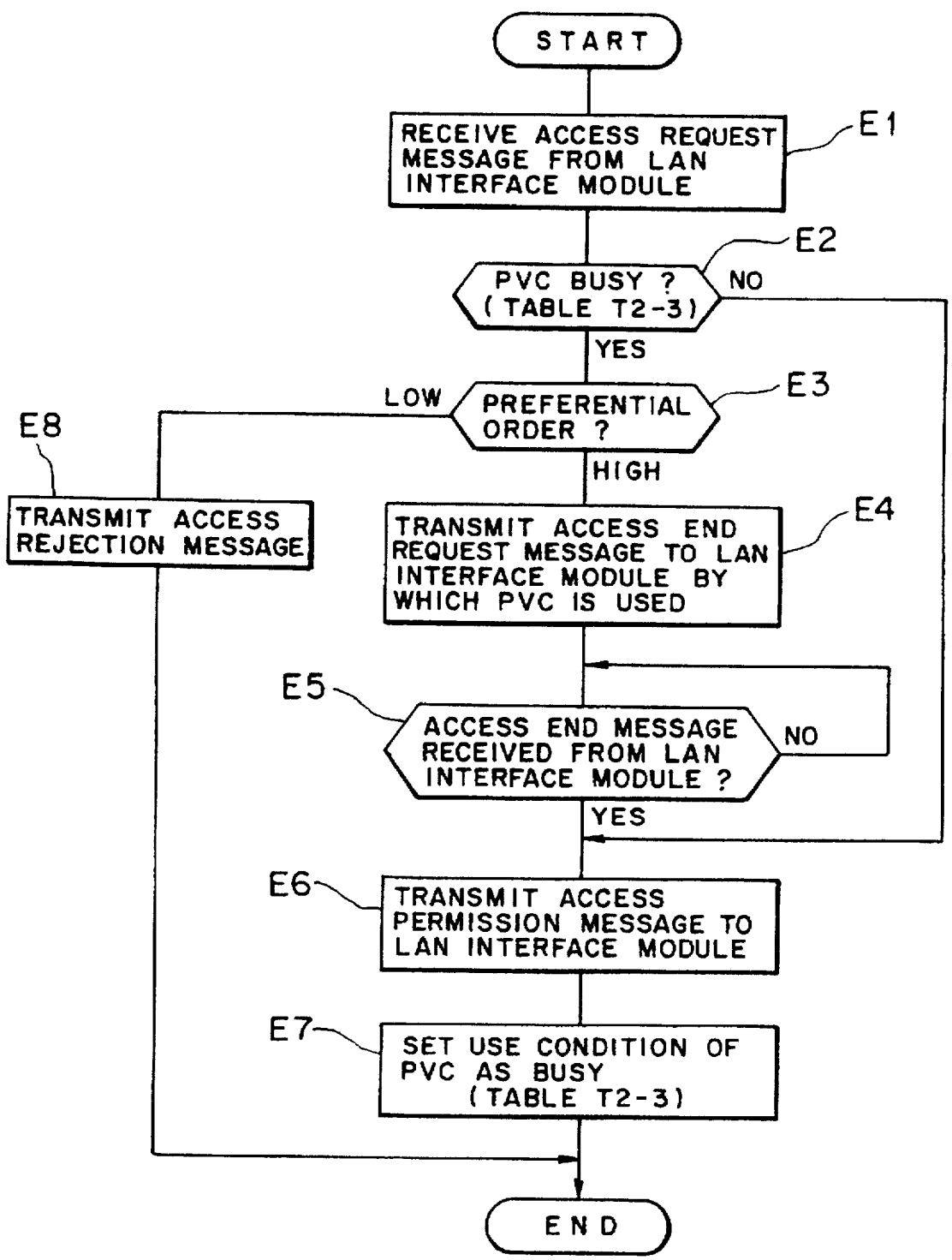

In the meantime, when the PVC control section 51 receives the access request message from the LAN interface module 31-2 (refer to step E1 of FIG. 24), it determines from the PVC use condition table T2-3 (refer to FIG. 26) thereof whether or not the PVC is busy (refer to step E2 of FIG. 24).

Thereafter, the PVC control section 51 determines, from the preferential order condition, the preferential order of the LAN interface module which has transmitted the access request message (refer to step E3 of FIG. 24). If the preferential order number is higher, then the PVC control section 51 transmits an access end request message to the LAN interface module by which the PVC is used at present (refer to step E4 of FIG. 24). Thereafter, when an access end message is received from the LAN interface module, the route of YES at step E5 of FIG. 24 is taken and the PVC control section 51 transmits an access permission message to the LAN interface module from which the access request message has been received (refer to step E6 of FIG. 24). Thereafter, the use condition of the PVC in the PVC use condition table T2-3 (refer to FIG. 26) is changed to "busy" (refer to step E7 of FIG. 24).

It is to be noted that, if the preferential order is lower, then the PVC control section 51 transmits an access rejection message to the LAN interface module from which the access request message has been received (refer to step E8 of FIG. 24).

On the other hand, when it is determined at step E2 that the PVC is free, the start of processing with step E6 is performed subsequently.

In this manner, also in the LAN frame switched network of the third embodiment of the present invention, high speed communications which make full use of the bandwidth of the ATM transmission line can be realized without dividing the bandwidth of the ATM transmission line by the connection number of PVCs. This contributes very much to realization of high speed connectionless communications which employ the ATM switch 11. Further, once a transmission apparatus acquires the access right, it can continue to hold the access right with certainty unless another transmission apparatus uses the PVC, and data transmission can be performed continuously without performing access control.

Figure 32:
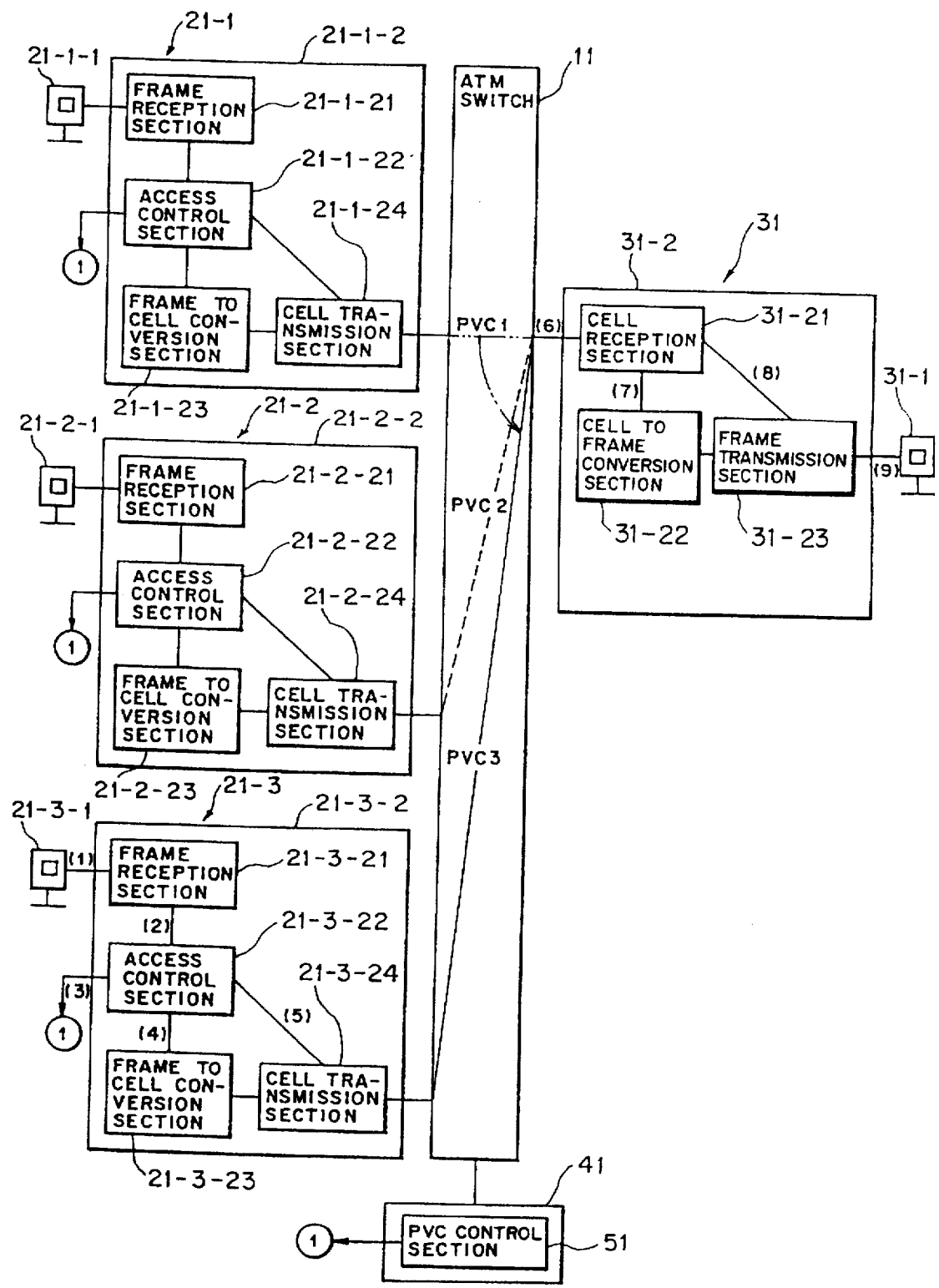
FIG. 32 is a block diagram showing a modification to the LAN frame switched network of FIG. 22.

It is to be noted that the PVC control section 51 of the LAN frame switched network in the third embodiment may alternatively be provided in the control apparatus 41 as shown in FIG. 32. The PVC control section 51 in this instance controls the right of use of the PVC not only with regard to the particular reception apparatus but also with regard to any reception apparatus accommodated in the switch. Also in this instance, the PVC control section 51 includes a PVC use condition table T2-3 (of a construction similar to that shown in FIG. 26).

The other construction and operation of the modified ATM frame switched network shown in FIG. 32 are similar to those of the ATM frame switched network of the third embodiment shown in FIG. 22.

In particular, in order to acquire the access right to the PVC, before a transmission apparatus 21-j transmits data, it transmits a message (access request message) requesting the right of use of the PVC to the PVC control section 51 and then transmits the data after it waits until it receives an access permission message from the PVC control section 51 as seen from FIGS. 27 and 28. On the other hand, upon reception of the access request message from the transmission apparatus 21-j, the PVC control section 51 determines whether or not the requested PVC is busy. Then, when the PVC is free, the PVC control section 51 transmits an access permission message. But on the contrary when the PVC is busy, the PVC control section 51 puts the transmission apparatus, which has made the request, into a queuing condition. Then, the PVC control section 51 transmits, to another transmission apparatus by which the PVC is used at present, a message (access end request message) requesting release of the right of use of the PVC. Then, after the PVC control section 51 receives an access end message from the last-mentioned transmission apparatus, it transmits an access permission message to the transmission apparatus which has made the request for access. Flows of the messages and flows of data in this instance are also such as illustrated in FIG. 29. It is to be noted that, when the PVC is busy in this instance, different processing may be performed in place of transmitting a message (access end request message) requesting release of the right of use of the PVC to the apparatus by which the PVC is used, such as, for example, putting the transmission apparatus, which has made the request for transmission, into a queuing condition.

Accordingly, also in this instance, once a transmission apparatus acquires the access right, it can hold the access right unless another apparatus uses the PVC. Consequently, the transmission of data can be performed continuously without performing access control.

On the other hand, depending upon a processing condition for a transmission apparatus which has made an inquiry, the PVC control section 51 determines, when it receives an access request message from a transmission apparatus 21-j, whether or not the PVC thus requested is busy, and transmits an access permission message when the PVC is free, but when the PVC is busy, the PVC control section 51 transmits an access rejection message similarly as seen from FIG. 30. Flows of the messages and flows of data in this instance are also such as illustrated in FIG. 31.

Accordingly, in this instance, once a transmission apparatus acquires the access right, it can continue to hold the access right with certainty unless another transmission apparatus uses the PVC, and transmission of data can be performed continuously without performing access control.

It is to be noted that, also in those instances, any of the bandwidths A, B and C of the PVCs PVC1, PVC2 and PVC3 can use a bandwidth independently within a range which does not exceed the bandwidth D of the ATM transmission line. That is, $A \leq D$, $B \leq D$ and $C \leq D$.

e. Fourth Embodiment

Figure 33:
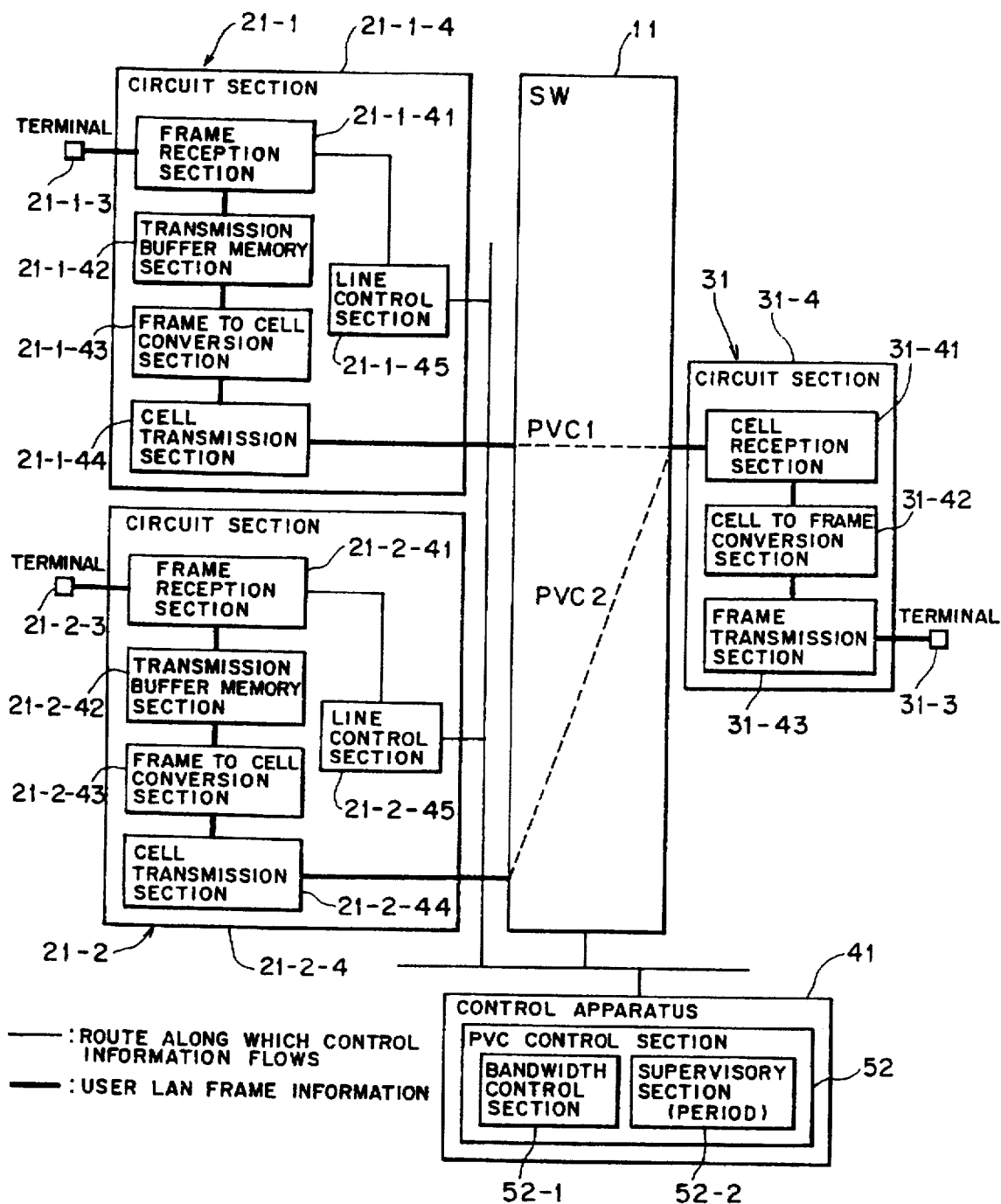
FIG. 33 is a block diagram of a still further LAN frame switched network showing a fourth preferred embodiment of the present invention.
Figure 34:
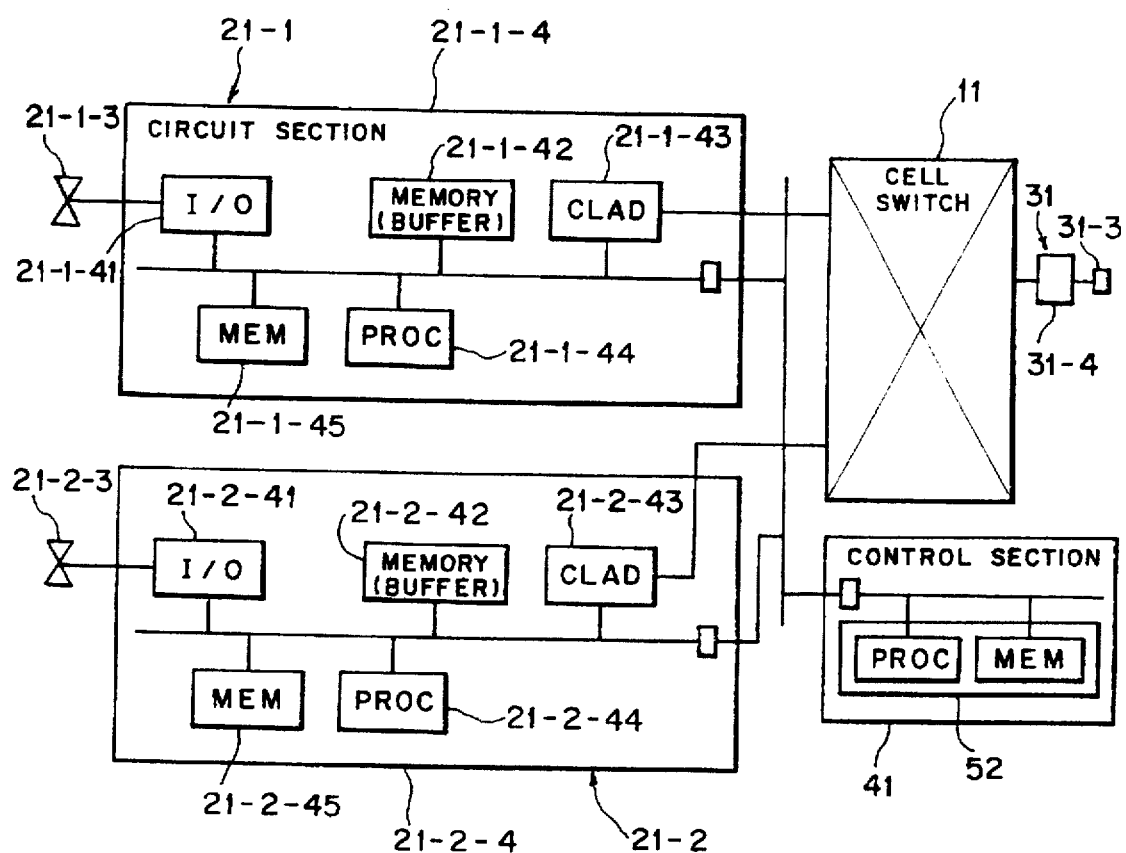
FIG. 34 is a block diagram showing a hardware construction of the LAN frame switched network of FIG. 33.

Referring now to FIGS. 33 and 34, there is shown a LAN frame switched network according to a fourth preferred embodiment of the present invention in which an ATM switch 11, that is, an exchange switch which handles fixed length cells, is employed.

Also in the LAN frame switched network shown in FIGS. 33 and 34, a plurality of transmission apparatus 21-1 and 21-2 connected to the ATM switch 11 and a reception apparatus 31 connected to the ATM switch 11 are connected to each other by PVC connections by way of the ATM switch 11. Also the ATM switch 11 is controlled by a control apparatus 41.

Each of the transmission apparatus 21-k (here, k=1, 2) includes a terminal (LAN terminal) 21-k-3 and a circuit section 21-k-4 serving as a LAN interface module.

A terminal for multi-media is used for the terminal 21-k-3, and the terminal 21-k-3 is accommodated in the respective circuit section 21-k-4 so that a frame signal from the terminal 21-k-3 is converted into cells by and transmitted from the circuit section 21-k-4.

To this end, the circuit section 21-k-4 is constituted from a frame reception section 21-k-41 serving as an input/output interface section (I/O), a transmission buffer memory section 21-k-42, a frame to cell conversion section (CLAD) 21-k-43, a cell transmission section 21-k-44, and a line control section (a line processor (LPR or PROC) and a memory section (MEM)) 21-k-45.

The frame reception section 21-k-41 receives a LAN frame. The transmission buffer memory section 21-k-42 queues LAN frames received by the frame reception section 21-k-41 in order to convert them into cells. The frame to cell conversion section 21-k-43 converts a LAN frame into ATM cells, and the cell transmission section 21-k-44 transmits ATM cells.

The line control section 21-k-45 communicates control information with a call processor of the control apparatus 41 to effect transmission control of LAN frame information of a user.

Meanwhile, the reception apparatus 31 is constituted by a terminal (LAN terminal) 31-3 and a circuit section 31-4 serving as a LAN interface module.

Also for the terminal 31-3, a terminal for multi-media corresponding to the LAN terminal 21-k-3 is employed.

The circuit section 31-4 receives a cell signal from the ATM switch 11, converts the cell signal back into a frame signal and sends the frame signal to the terminal 31-3 accommodated in the circuit section 31-4. To this end, the circuit section 31-4 is constituted from a cell reception section (cell reception means) 31-41, a cell to frame conversion section 31-42, and a frame transmission section 31-43.

The cell reception section 31-41 receives ATM cells. The cell to frame conversion section 31-42 converts the ATM cells into a LAN frame. The frame transmission section 31-43 transmits the LAN frame.

The circuit sections 21-k-4 are connected to the ATM switch 11 and accommodate the respective terminals 21-k-3 as described above, and the circuit sections 21-k-4 at the transmission side and the circuit section 31-4 at the reception side are connected to each other by way of PVCs PVC1 and PVC2, respectively.

The control apparatus 41 includes a PVC control section 52 which is constituted by a bandwidth control section 52-1 and a supervisory section 52-2. The control apparatus 41 includes, from a point of view of hardware, a call processor (CPR or PROC) and a memory section (MEM).

The bandwidth control section 52-1 sets a transmission line bandwidth for each frame as an information unit handled by the transmission apparatus 21-k. The supervisory section 52-2 has a function of bandwidth setting determination means for determining, upon setting of a transmission line bandwidth, permission or rejection of acceptance of setting of a transmission line bandwidth depending upon whether the sum of a bandwidth being used at present and a requested bandwidth exceeds a maximum usable bandwidth, and further has a function of supervisory means for putting, when it is determined by the bandwidth setting determination means that acceptance of setting of a bandwidth should be rejected, a bandwidth setting request from a transmission apparatus 21-k into a queuing condition and then allowing, when permission of acceptance of setting of a bandwidth becomes possible, the transmission apparatus which has requested setting of a bandwidth to effect transmission to the reception apparatus 31 with the transmission line bandwidth set for each frame.

In particular, in the LAN frame switched network of the fourth embodiment, a requested band is calculated by the bandwidth control section 52 (CPR) of the control apparatus 41 and is compared with the remaining use band by the control apparatus 41. Now, if the maximum usable bandwidth is a1 Mbps, the busy bandwidth at present is b1 Mbps and the requested bandwidth for the future use is c1 Mbps, they have the relationship of $a1-b1=c1$.

Calculation of a bandwidth proceeds in the following manner.

Figure 35A:
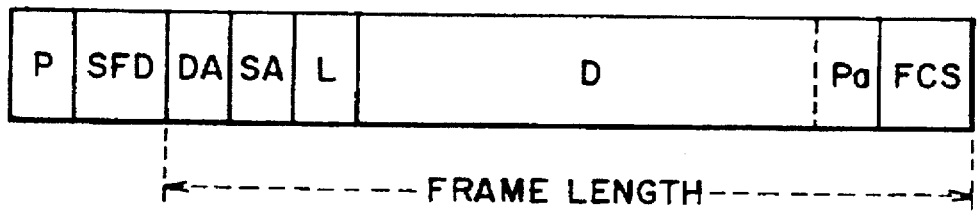
FIGS. 35(a) to 35(c) are diagrammatic views illustrating frame formats of the LAN of the LAN frame switched network of FIG. 33.
Figure 35B:
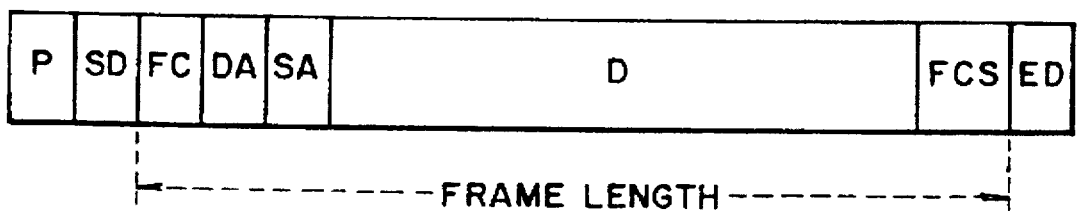
Figure 35C:
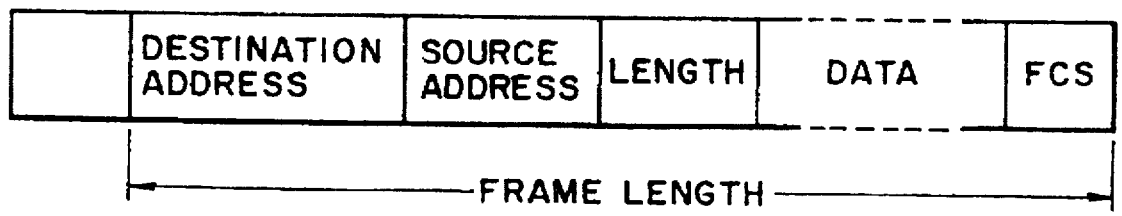

First, the frame format of the LAN has such a construction as shown in FIG. 35(a) or 35(b) and has, as viewed from a general point of view, such a construction as shown in FIG. 35(c). It is to be noted that, in FIGS. 35(a) and 35(b), reference character P denotes a preamble, SFD a start frame delimiter, SD a start delimiter, DA a destination address, FC a frame control, SA a source address, L a length, D data, Pa a pad, FCS a frame check sequence, and ED an end delimiter.

Now, if it is assumed that the frame length is, for example, 64 octets, a requested bandwidth to be used is such as follows.

Since $1/100 \text{ Mbps}=0.01\times10^{-6}=10$ ns, one bit requires 10 ns. Further, since 64 octets are 64×8 bits, 64×8 bits require 5,120 ns, that is, 5.12 μs.

Accordingly, $1/5.12 \text{ μs}=0.2\times10^{6}=0.2$ Mbps, and this is a requested bandwidth for the frame length of 64 octets.

While a requested band is calculated in this manner, the following processing is performed by the band control section 52-1 of the PVC control section 52.

In particular, when $c1 \geq$ requested bandwidth (0.2 Mbps), acceptance is permitted, but when $c1 <$ requested bandwidth (0.2 Mbps), acceptance is rejected.

Subsequently, bandwidth control processing for each frame which is performed by the bandwidth control section 52 will be described with reference to FIGS. 36 to 39.

Figure 36:
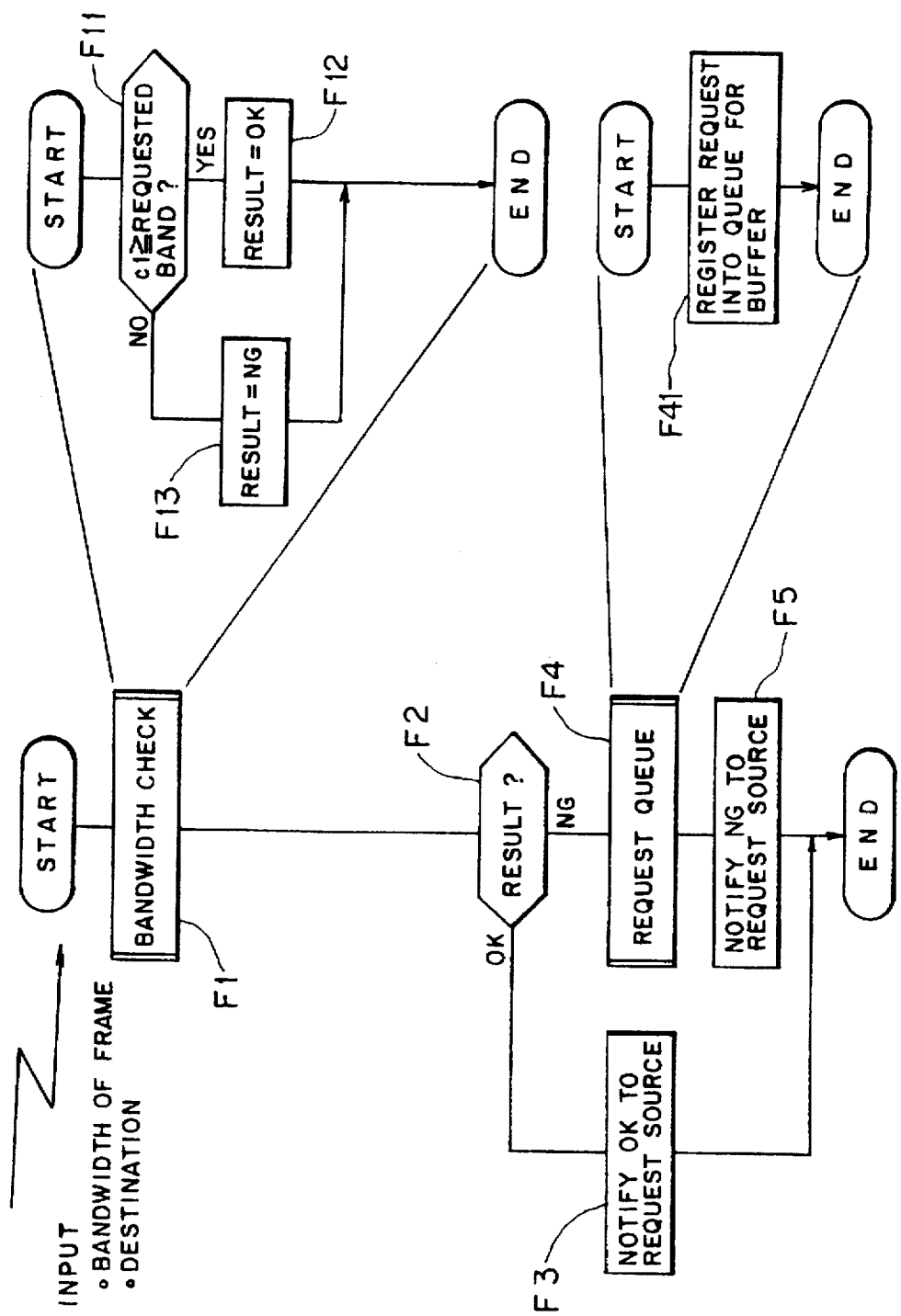
FIG. 36 is a flow chart illustrating operation of the LAN frame switched network of FIG. 33.

When a frame bandwidth and a destination are inputted, the bandwidth control section 52 first performs checking of a bandwidth at step F1 of FIG. 36.

In the checking of a bandwidth, it is first determined at step F11 of FIG. 36 whether or not the relationship of $c1 \geq$ (requested band width) stands, and if the relationship stands, the bandwidth control section 52 determines permission of acceptance (result=OK) (step F12 of FIG. 36), but otherwise, the bandwidth control section 52 determines rejection of acceptance (result=NG) (step F13 of FIG. 36).

After such checking of a bandwidth, the bandwidth control section 52 refers to the result of checking (step F2 of FIG. 36), and when the result of checking is OK (permission of acceptance), the bandwidth control section 52 notifies OK to the source transmission apparatus which has requested a bandwidth (step F3 of FIG. 36). On the contrary, when the result of checking is NG (rejection of acceptance), the bandwidth control section 52 queues the request (step F4 of FIG. 36) and notifies NG to the source transmission apparatus which has requested a bandwidth (step F5).

Figure 37:
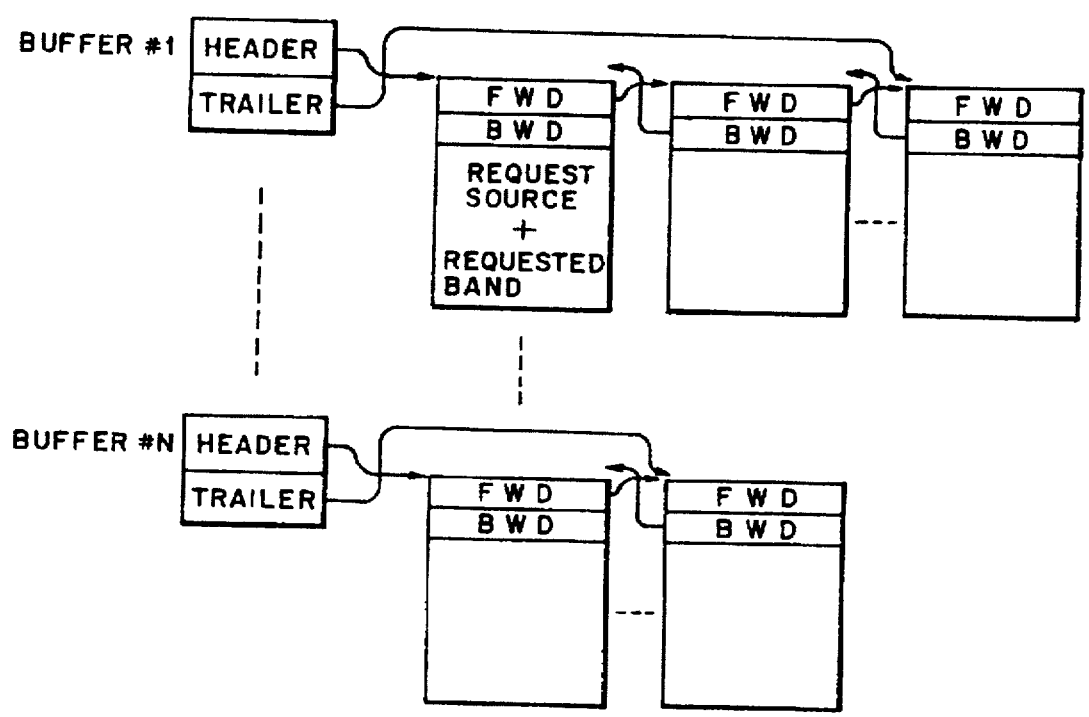
FIG. 37 is a diagrammatic view illustrating operation of the LAN frame switched network of FIG. 33.

When the bandwidth control section 52 queues the request as described above, it registers the request into a relevant queue for the corresponding buffer as shown in FIG. 37 (step F41 of FIG. 36).

Figure 38:
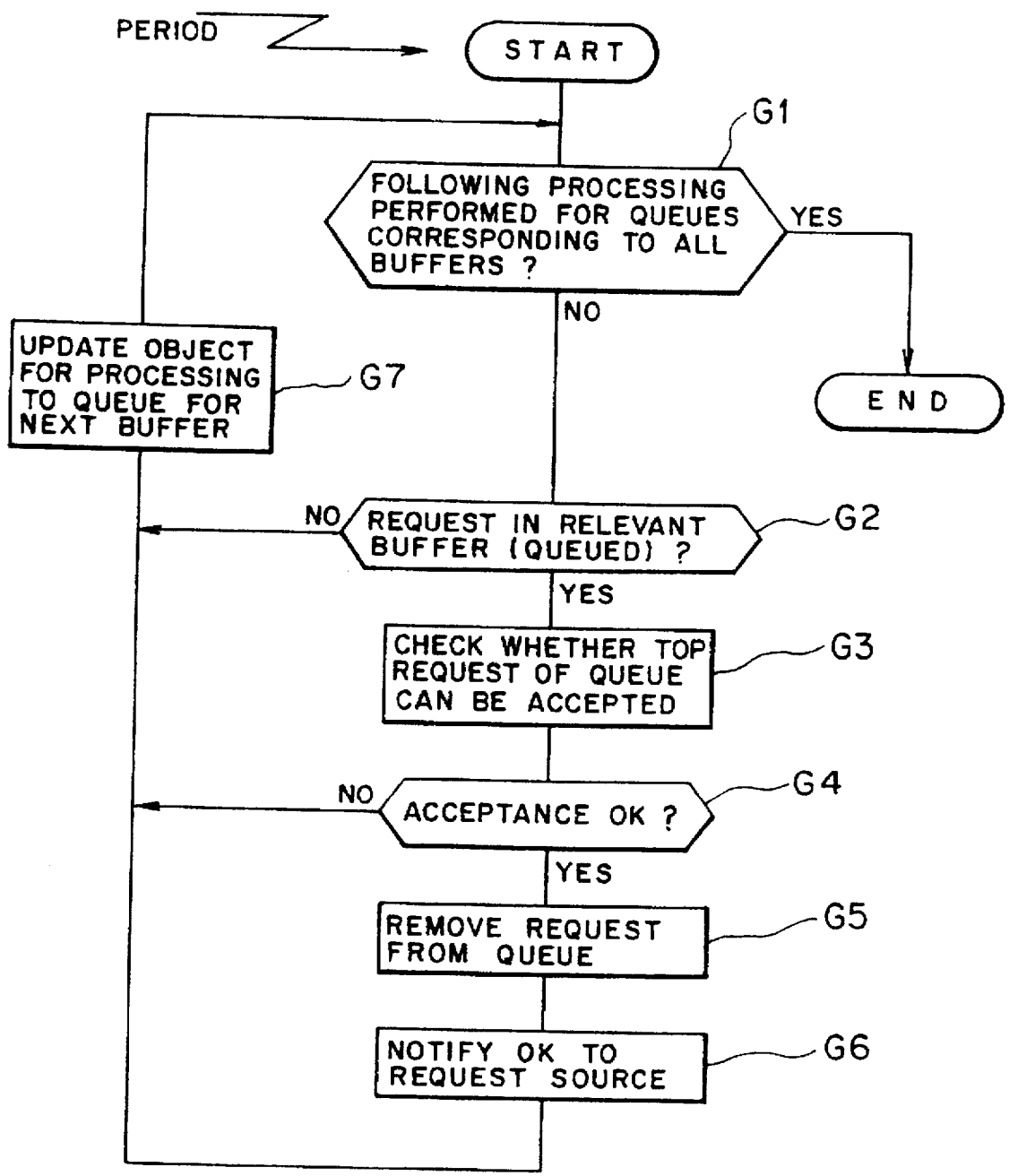
FIG. 38 is a flow chart illustrating operation of the LAN frame switched network of FIG. 33.

Meanwhile, the supervisory section 52-2 of the PVC control section 52 periodically performs such processing as illustrated in FIG. 38. In particular, referring to FIG. 38, the supervisory section 52-2 determines at step G1 whether or not the following processing has been performed for all of queues corresponding to the buffers. Since the determination is NO at an initial stage of the processing, the supervisory section 52-2 determines at step G2 whether or not there is a request for a relevant buffer, that is, whether or not a request is queued. If the determination is YES at step G2, the supervisory section 52-2 checks at step G3 whether or not the request at the top of the queue can be accepted. Thereafter, the supervisory section 52-2 determines at step G4 whether or not acceptance of the request should be permitted. If the request should be accepted, the request is removed from the queue (step G5) and a notification of OK is transmitted to the source transmission apparatus of the request (step G6).

Thereafter, the object for processing is changed to a queue for a next buffer at step G7, and then, the processing beginning with step G1 is repeated. It is to be noted that, also when the determination at step G2 or G4 is NO, the object for processing is changed to a queue for a next buffer at step G7, and then the processing beginning with step G1 is repeated.

Figure 39A:
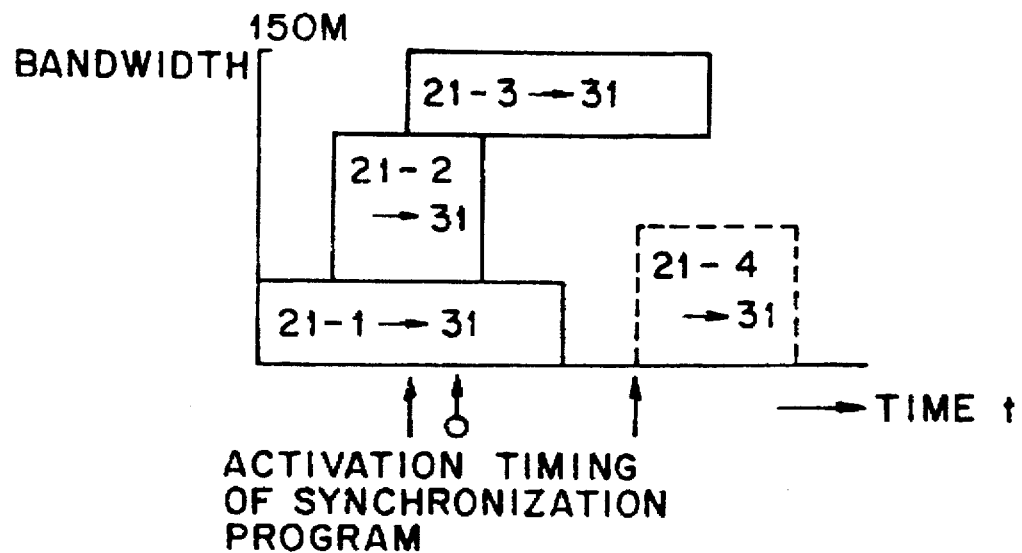
FIGS. 39(a) and 39(b) are diagrammatic views illustrating operation of the LAN frame switched network of FIG. 33.
Figure 39B:
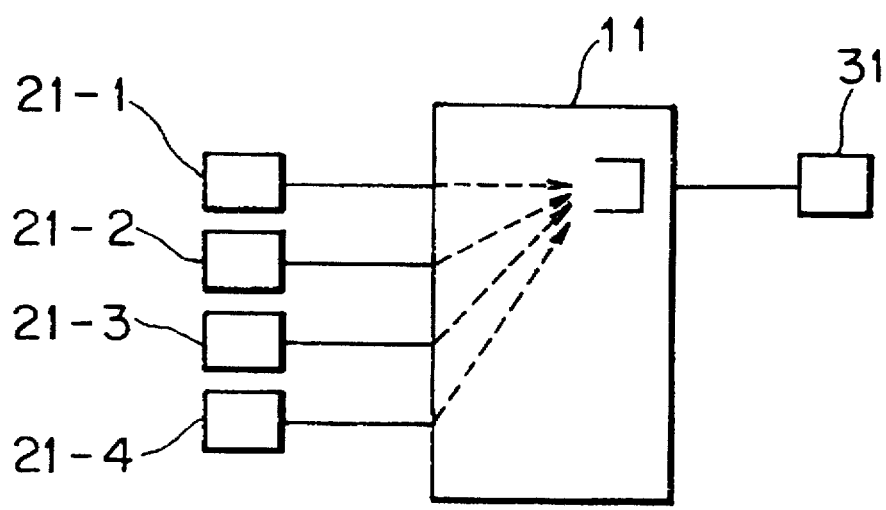
Figure 40:
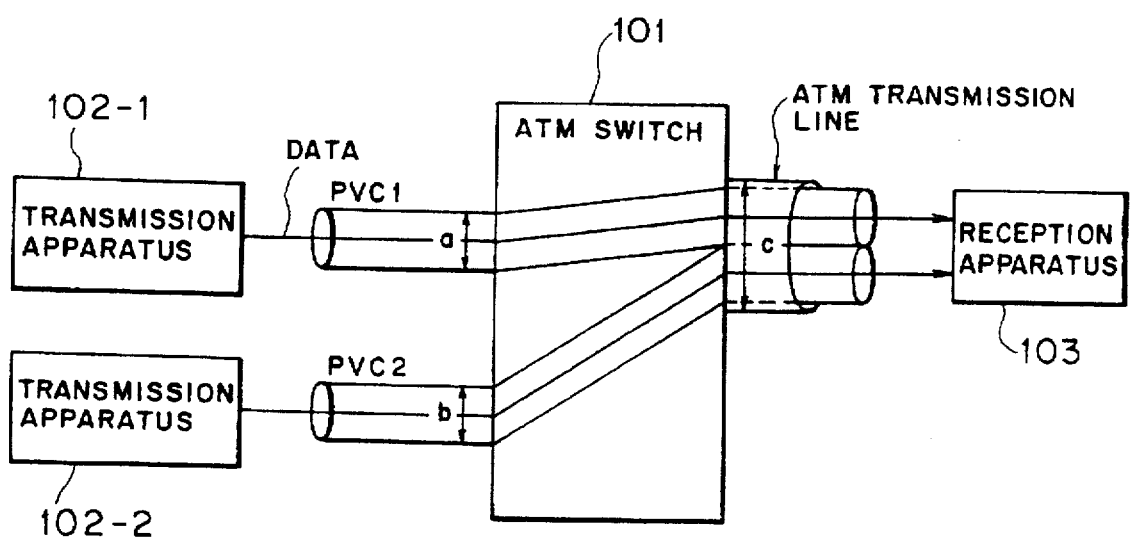
FIG. 40 is a block diagram showing an exemplary PVC connection type switched network.
Figure 41:
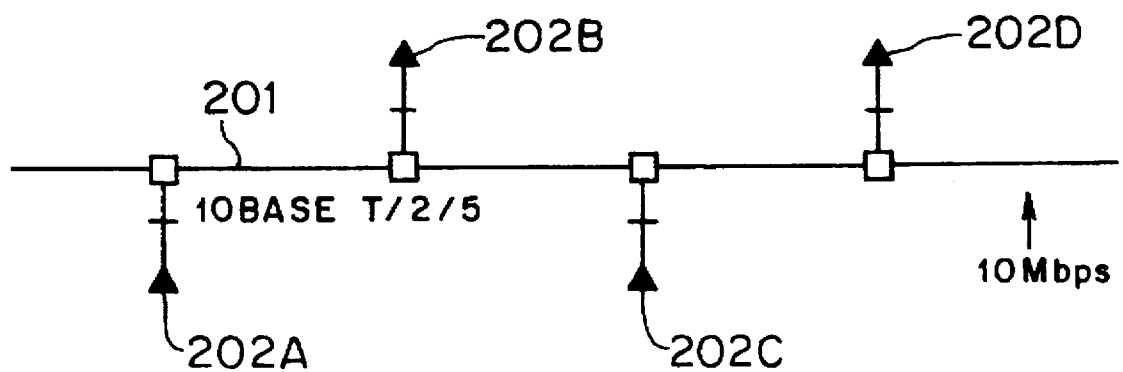
FIG. 41 is a diagrammatic view showing an Ethernet construction.
Figure 42:
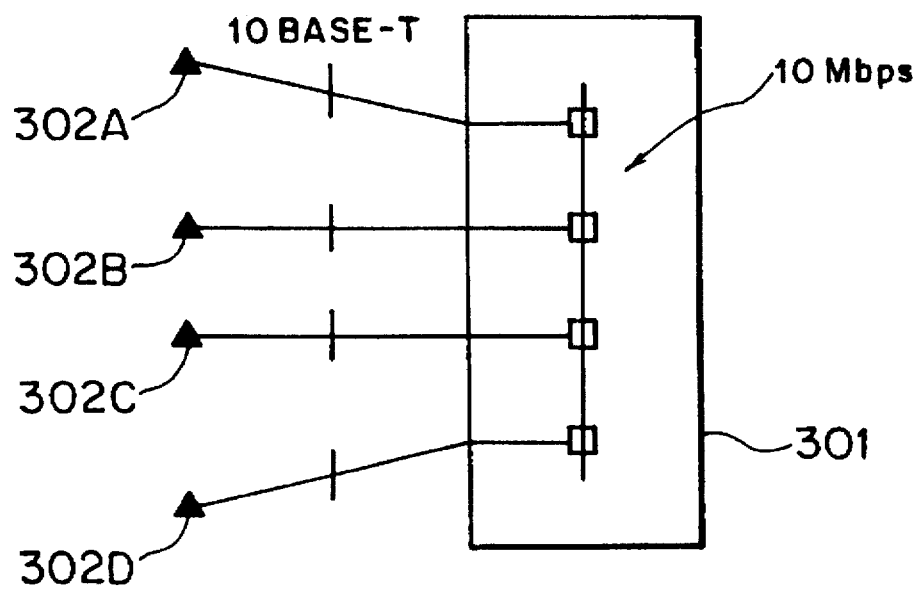
FIG. 42 is a diagrammatic view showing an HUB construction.
Figure 43:
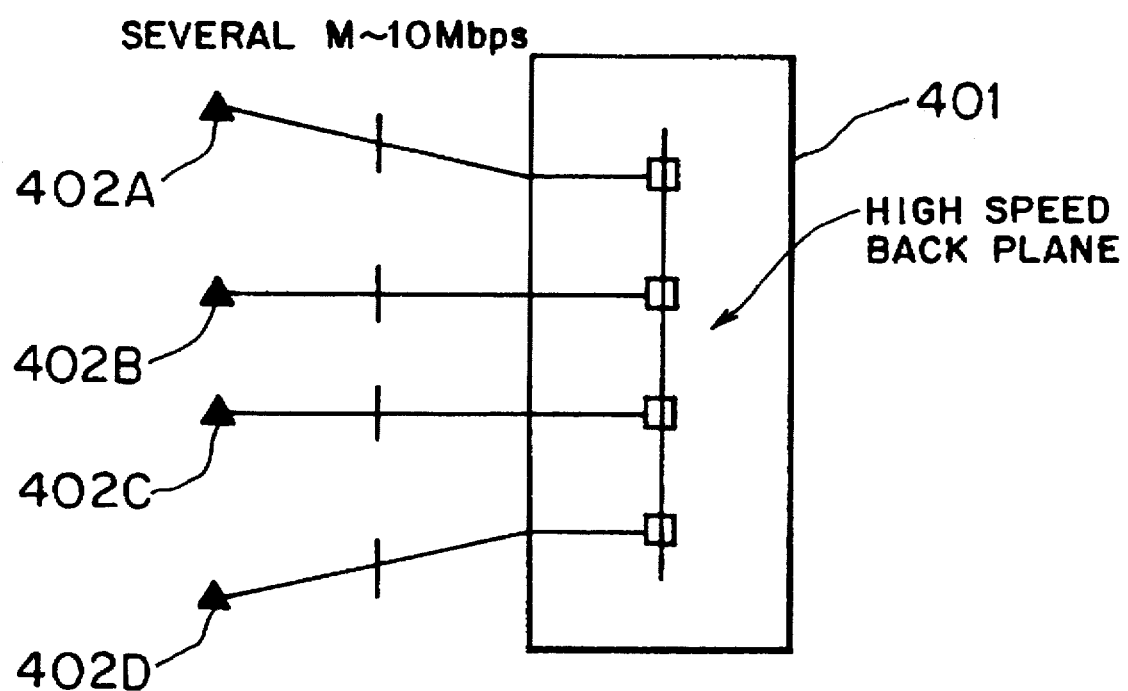
FIG. 43 is a diagrammatic view showing a high speed HUB construction.
Figure 44:
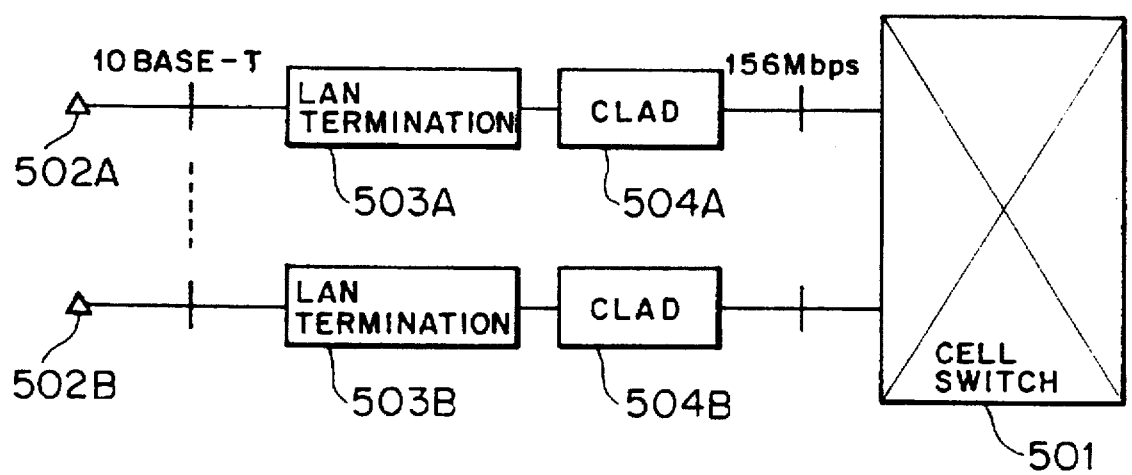
FIG. 44 is a diagrammatic view showing the construction of a switched network which includes a cell switch as a back plane.
Figure 45:
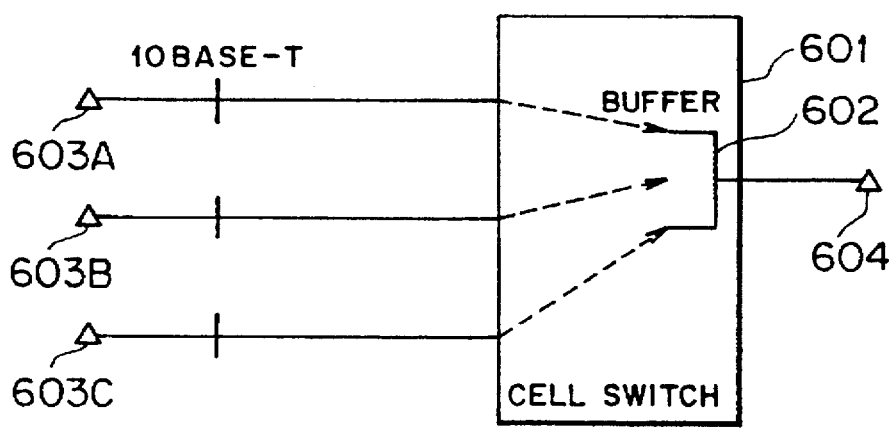
FIG. 45 is a block diagram showing the construction of a switched network which includes a cell switch having a buffer therein.
Figure 46:
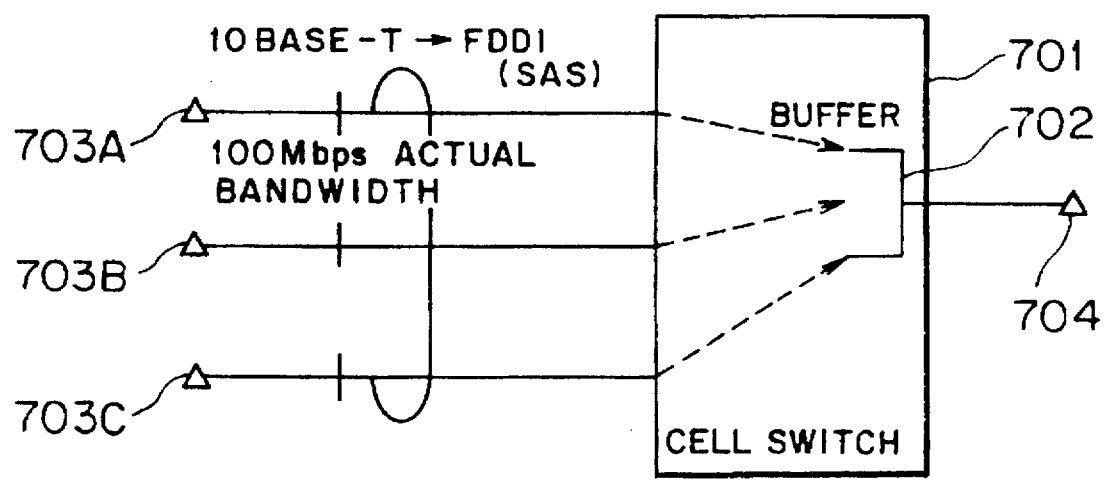
FIG. 46 is a diagrammatic view showing the construction of another switched network which includes a cell switch having a buffer therein.

An example of a result of such processing is illustrated in FIG. 39(a). In particular, in this instance, for example, four transmission apparatus 21-1 to 21-4 are accommodated in the exchange switch 11 (refer to FIG. 39(b)). It can be seen that, first, the transmission apparatus 21-1 to 21-3 are communicating with the reception apparatus 31, and communications of the transmission apparatus 21-4 are permitted at a next supervisory timing after communications of the transmission apparatus 21-1 and 21-2 are completed.

In this manner, in a system wherein a high speed ATM cell switch is provided as a back plane and a high speed LAN interface (for example, FDDI(SAS) or TPDDI) on which a bandwidth is used fully is accommodated, when data of the LAN are to be switched by the ATM cell switch, bandwidth control is performed for each frame, that is, a frame bandwidth is calculated from a frame length for each frame of the LAN and then it is determined from the bandwidth at the point of time of a request whether or not acceptance of a requested frame can be permitted. Consequently, simultaneous communications can be performed with certainty.

Further, since such supervision that, when acceptance is not permitted upon bandwidth control, a request is queued and the bandwidth of an output line is periodically checked to determine permission or rejection of acceptance of a requested band and then information of a free bandwidth is notified when the condition wherein acceptance is permitted is entered, even if acceptance was impossible when the request was received, if a free bandwidth thereafter appears, then acceptance of communications with the desired requested bandwidth becomes possible, and accordingly, simultaneous communications can be performed effectively.

It is to be noted that calculation of a requested bandwidth may alternatively be performed by the control section 21-k-45 of each circuit section 21-k-4 while processing beginning with comparison calculation for the remaining use bandwidth is performed by the control apparatus 41.

f. Others

It is to be noted that the numbers of the transmission apparatus and the reception apparatus in the embodiments described above are mere examples, and it is considered that actually the exchange switch 11 accommodates greater numbers of such apparatus. Naturally, the embodiments of the present invention can be applied to any of such exchange switches.

Further, while only one transmission apparatus communicates with the reception apparatus 31 in the LAN frame switched networks of the first to third embodiments described above, they may naturally be modified such that two or more ones of transmission apparatus involved which have acquired an access right to a PVC to be used perform transmission to the reception apparatus 31 using respective desired transmission line bandwidths. This is presumed particularly where a large number of transmission apparatus are involved.

The present invention is not limited to the specifically described embodiment, and variations and modifications may be made without departing from the scope of the present invention.

What is claimed is:

1. In a communication method for a network wherein a plurality of transmission terminal apparatus each including a terminal and an interface module and at least one reception terminal apparatus including a terminal and an interface module are connected to each other by virtual channels of the type provided for communications between at least two fixed apparatus by an exchange switch which handles fixed length packets, the improvement comprising the steps of:

circulating normally a message representative of an access right to a virtual channel of said type among said plurality of transmission terminal apparatus;

acquiring by any of said transmission terminal apparatus itself the access right to said virtual channel to be used by receiving the message; and performing, by said one or more transmission terminal apparatus which has acquired the access right to said virtual channel to be used, transmission to said reception terminal apparatus using respective transmission line bandwidths.

2. In a communication method for a network wherein a plurality of transmission terminal apparatus each including a terminal and an interface module and at least one reception terminal apparatus including a terminal and an interface module are connected to each other by virtual channels of the type provided for communications between at least two fixed apparatus by an exchange switch which handles fixed length packets, and virtual channel control means is connected to said reception terminal apparatus for controlling a right of use of a virtual channel of said type, the improvement comprising the steps of:

successively giving the access right to said plurality of transmission terminal apparatus by said virtual channel control means, so that the transmission terminal apparatus itself acquires the access right to the virtual channel of said type; and performing, by said one or more transmission terminal apparatus which has acquired the access right to said virtual channel to be used, transmission to said reception terminal apparatus using respective transmission line bandwidths.

3. A communication method for a network as claimed in claim 2, wherein said virtual channel control means is provided in said reception terminal apparatus.

4. A communication method for a network as claimed in claim 2, wherein said virtual channel control means is provided in a control apparatus of said exchange switch.

5. In communication method for a network wherein a plurality of transmission terminal apparatus each including a terminal and an interface module and at least one reception terminal apparatus including a terminal and an interface module are connected to each other by virtual channels of the type provided for communications between at least two fixed apparatus by an exchange switch which handles fixed length packets, and virtual channel control means is connected to said reception terminal apparatus for controlling a right to use a virtual channel of said type, the improvement comprising the steps of:

acquiring by any of said plurality of transmission terminal apparatus itself an access right to a virtual channel of said type to be used by inquiring said virtual channel control means upon starting communications with said reception terminal apparatus; and performing, by said one or more transmission terminal apparatus which has acquired the access right to said virtual channel to be used, transmission to said reception terminal apparatus using respective transmission line bandwidths.

6. A communication method for a network as claimed in claim 5, wherein, when the virtual channel of said type connected to said reception terminal apparatus is busy as a result of the inquiry to said virtual channel control means, said virtual channel control means performs access right giving processing in accordance with a preferential order condition.

7. A communication method for a network as claimed in claim 6, wherein, when the virtual channel of said type connected to said reception terminal apparatus is busy as a result of the inquiry to said virtual channel control means, and said virtual channel control means queues the transmission terminal apparatus which has made the inquiry, and after the virtual channel of said type is released, said virtual channel control means gives the access right to the transmission terminal apparatus.

8. A communication method for a network as claimed in claim 7, wherein said virtual channel control means is provided in said reception terminal apparatus.

9. A communication method for a network as claimed in claim 7, wherein said virtual channel control means is provided in a control apparatus of said exchange switch.

10. A communication method for a network as claimed in claim 6, wherein, when the virtual channel of said type connected to said reception terminal apparatus is busy as a result of the inquiry to said virtual channel control means, said virtual channel control means provides, to the transmission terminal apparatus which has made the inquiry, a message of rejection.

11. A communication method for a network as claimed in claim 10, wherein said virtual channel control means is provided in said reception terminal apparatus.

12. A communication method for a network as claimed in claim 10, wherein said virtual channel control means is provided in a control apparatus of said exchange switch.

13. A communication method for a network as claimed in claim 6, wherein said virtual channel control means is provided in said reception terminal apparatus.

14. A communication method for a network as claimed in claim 6, wherein said virtual channel control means is provided in a control apparatus of said exchange switch.

15. A communication method for a network as claimed in claim 5, wherein said virtual channel control means is provided in said reception terminal apparatus.

16. A communication method for a network as claimed in claim 5, wherein said virtual channel control means is provided in a control apparatus of said exchange switch.

17. A transmission terminal apparatus for a network wherein said transmission terminal apparatus is connected by a virtual channel of the type provided for communications between at least two fixed apparatus to a reception terminal apparatus including a terminal and an interface module together with one or more other transmission terminal apparatus each including a terminal and an interface module, by an exchange switch which handles fixed length packets, the transmission terminal apparatus comprising:

a terminal and an interface module;

said interface module of said transmission terminal apparatus including:

access right acquisition determination means for determining whether or not an access right to a virtual channel of said type to be used is acquired by receiving a message representative of the access right which is circulated among the transmission terminal apparatus involved in said network; and packet sending means for transmitting fixed length packets to said reception terminal apparatus using a transmission line bandwidth when it is determined by said access right acquisition determination means that the access right to the virtual channel of said type is acquired.

18. A transmission terminal apparatus for a network wherein said transmission terminal apparatus is connected by a virtual channel of the type provided for communications between at least two fixed apparatus to a reception terminal apparatus including a terminal and an interface module together with one or more other transmission terminal apparatus each including a terminal and an interface module by an exchange switch which handles fixed length packets, and virtual channel control means is connected to said reception terminal apparatus for controlling a right of use of a virtual channel of said type, the transmission terminal apparatus comprising:

a terminal and an interface module;

said interface module of said transmission terminal apparatus including:

access right acquisition determination means for determining that the access right is acquired when the access right is given by said virtual channel control means; and packet sending means for transmitting fixed length packets to said reception terminal apparatus using a transmission line bandwidth when it is determined by said access right acquisition determination means that the access right to the virtual channel of said type is acquired.

19. A reception terminal apparatus for a network wherein said reception terminal apparatus is connected by virtual channels of the type provided for communications between at least two fixed apparatus to a plurality of transmission terminal apparatus each including a terminal and an interface module by an exchange switch which handles fixed length packets, the virtual channels having bandwidths each of which is maximally equal to a bandwidth of a transmission line, the reception terminal apparatus comprising:

a terminal and an interface module;

said interface module of said reception terminal apparatus including:

packet reception means for receiving packets; and virtual channel control means for controlling a right of use of the virtual channel of said type;

said virtual channel control means giving an access right to one after another of said plurality of transmission terminal apparatus to allow communication between said reception terminal apparatus and the transmission terminal apparatus, which has the access right given thereto, using the bandwidth which is maximally equal to the bandwidth of the transmission line.

20. A reception terminal apparatus for a network as claimed in claim 19, wherein said virtual channel control means receives inquiry information for acquisition of the access right sent thereto when any of said plurality of transmission terminal apparatus tries to start communications with said reception terminal apparatus, and gives the access right to the transmission terminal apparatus in response to the inquiry information.

21. A reception terminal apparatus for a network as claimed in claim 20, wherein said virtual channel control means performs access right giving processing in accordance with a preferential order condition when the virtual channel of said type connected to said reception terminal apparatus is busy.

22. A reception terminal apparatus for a network as claimed in claim 21, wherein said virtual channel control means queues, when the virtual channel of said type connected to said reception terminal apparatus is busy, that one of said transmission terminal apparatus from which the inquiry information has been received, and after the virtual channel of said type is released, said virtual channel control means gives the access right to the queued transmission terminal apparatus.

23. A reception terminal apparatus for a network as claimed in claim 21, wherein said virtual channel control means provides, when the virtual channel of said type connected to said reception terminal apparatus is busy, a message of rejection.

24. A virtual channel control apparatus for a network wherein a plurality of transmission terminal apparatus each including a terminal and an interface module and at least one reception terminal apparatus including a terminal and an interface module are connected to each other by virtual channels of the type provided for communications between at least two fixed apparatus by an exchange switch which handles fixed length packets, the virtual channels having bandwidths each of which is maximally equal to a bandwidth of a transmission line, the virtual channel control apparatus comprising:

virtual channel control means for controlling a right of use of a virtual channel of said type;

said virtual channel control means giving an access right to one after another of said plurality of transmission terminal apparatus to allow communication between said reception terminal apparatus and the transmission terminal apparatus, which has the access right given thereto, using the bandwidth which is maximally equal to the bandwidth of the transmission line.

25. A virtual channel control apparatus for a network as claimed in claim 24, wherein said virtual channel control means receives inquiry information for acquisition of the access right sent thereto when any of said plurality of transmission terminal apparatus tries to start communications with said reception terminal apparatus, and gives the access right to the transmission terminal apparatus in response to the inquiry information.

26. A virtual channel control apparatus for a network as claimed in claim 25, wherein said virtual channel control means performs access right giving processing in accordance with a preferential order condition when the virtual channel of said type connected to said reception terminal apparatus is busy.

27. A virtual channel control apparatus for a network as claimed in claim 26, wherein said virtual channel control means queues, when the the virtual channel of said type connected to said reception terminal apparatus is busy, that one of said transmission terminal apparatus from which the inquiry information has been received, and after said virtual channel is released, said virtual channel control means gives the access right to the queued transmission terminal apparatus.

28. A virtual channel control apparatus for a network as claimed in claim 26, wherein said virtual channel control means provides, when the virtual channel of said type connected to said reception terminal apparatus is busy, a message of rejection.

29. A communication method for a network wherein a transmission apparatus and a reception apparatus are connected to each other by a virtual channel of the type provided for communications between at least two fixed apparatus by an exchange switch which handles fixed length packets, the method comprising the steps of:

determining, upon setting of a transmission line bandwidth, by bandwidth setting determination means, whether acceptance of setting of a transmission line bandwidth is to be permitted or rejected, depending upon whether or not the sum of a bandwidth being used at present and a requested bandwidth exceeds a maximum usable bandwidth;

queuing a bandwidth setting request from said transmission apparatus when it is determined by said bandwidth setting determination means that acceptance of setting of a transmission line bandwidth should be rejected, and permitting, after permission of acceptance of setting of a transmission line bandwidth becomes possible, said transmission apparatus which has made the bandwidth setting request to perform transmission to said reception apparatus with the transmission line bandwidth set for each frame; and performing transmission to said reception apparatus using the transmission line bandwidth set for each frame of the network, as an information unit, which is handled by said transmission apparatus.

30. A transmission line bandwidth control apparatus for a network wherein a transmission apparatus and a reception apparatus are connected to each other by a virtual channel of the type provided for communications between at least two fixed apparatus by an exchange switch which handles fixed length packets, the control apparatus comprising:

bandwidth setting means for setting a transmission line bandwidth for each frame of a network, as an information unit which is handled by said transmission apparatus;

bandwidth setting determination means for determining, upon setting of a transmission line bandwidth, whether acceptance of setting of a transmission line bandwidth is to be permitted or rejected, depending upon whether or not the sum of a bandwidth being used at present and a requested bandwidth exceeds a maximum usable bandwidth; and supervisory means for queuing, when it is determined by said bandwidth setting determination means that acceptance of setting a transmission line bandwidth should be rejected, a bandwidth setting request from said transmission apparatus and permitting, when permission of acceptance of setting of a transmission line bandwidth thereafter becomes possible, said transmission apparatus which has made the bandwidth setting request to perform transmission to said reception apparatus with the transmission line bandwidth set for each frame.

* * * * *